(12) United States Patent
Horn et al.

(10) Patent No.: US 9,975,629 B2
(45) Date of Patent: May 22, 2018

(54) CONTROL SYSTEM FOR A STOPPED ROTOR AIRCRAFT

(71) Applicant: Kitty Hawk Corporation, Mountain View, CA (US)

(72) Inventors: Gregory Mainland Horn, Mountain View, CA (US); Damon Vander Lind, Oakland, CA (US)

(73) Assignee: Kitty Hawk Corporation, Mountain View, CA (US)

( * ) Notice: Subject to any disclaimer, the term of this patent is extended or adjusted under 35 U.S.C. 154(b) by 0 days. days.

(21) Appl. No.: 15/599,195

(22) Filed: May 18, 2017

(65) Prior Publication Data

US 2017/0341741 A1    Nov. 30, 2017

Related U.S. Application Data

(60) Provisional application No. 62/340,974, filed on May 24, 2016.

(51) Int. Cl.
| | |
|---|---|
| *B64C 27/22* | (2006.01) |
| *B64C 27/24* | (2006.01) |
| *G05B 11/42* | (2006.01) |
| *B64C 27/26* | (2006.01) |
| *B64C 29/00* | (2006.01) |
| *B64C 27/82* | (2006.01) |

(52) U.S. Cl.
CPC .............. *B64C 27/24* (2013.01); *B64C 27/26* (2013.01); *B64C 27/82* (2013.01); *B64C 29/0025* (2013.01); *G05B 11/42* (2013.01); *B64C 2027/8236* (2013.01)

(58) Field of Classification Search
CPC ......... B64C 27/22; B64C 27/24; B64C 27/26; B64C 27/28; B64C 27/30; B64C 29/0008; B64C 29/0016; B64C 29/0025
See application file for complete search history.

(56) References Cited

U.S. PATENT DOCUMENTS

| | | | | |
|---|---|---|---|---|
| 3,794,273 | A * | 2/1974 | Girard ................... | B64C 27/026 244/17.19 |
| 3,986,686 | A * | 10/1976 | Girard ..................... | B64C 27/24 244/7 A |
| 4,678,401 | A * | 7/1987 | Bradford ................. | B64C 27/24 416/143 |
| 6,161,799 | A * | 12/2000 | Nyhus ..................... | B64C 27/24 244/7 A |
| 6,193,464 | B1 * | 2/2001 | Nyhus ..................... | B60T 1/065 416/169 R |
| 6,234,422 | B1 | 5/2001 | Bolonkin | |
| 6,471,158 | B1 * | 10/2002 | Davis ...................... | B64C 27/02 244/8 |
| 6,513,752 | B2 | 2/2003 | Carter | |

(Continued)

*Primary Examiner* — Richard G Davis
(74) *Attorney, Agent, or Firm* — Van Pelt, Yi & James LLP

(57) ABSTRACT

While an aircraft is mid-flight, a braking start point associated with a stoppable rotor is calculated where the stoppable rotor includes a first and second blade and the stoppable rotor is configured to rotate about a substantially vertical axis. A process to stop the stoppable rotor is started, while the aircraft is mid-flight, when the stoppable rotor reaches the braking start point, where the stoppable rotor is stopped with the first blade pointing forward and the second blade pointing backward.

18 Claims, 20 Drawing Sheets

(56) References Cited

U.S. PATENT DOCUMENTS

| | | | |
|---|---|---|---|
| 6,622,962 B1* | 9/2003 | White | B64C 27/26 244/12.3 |
| 7,918,415 B2 | 4/2011 | De La Cierva Hoces | |
| 8,376,266 B2 | 2/2013 | Gemmati | |
| 2006/0266879 A1* | 11/2006 | Svoboda, Jr. | B64C 27/08 244/7 A |
| 2009/0045294 A1* | 2/2009 | Richardson | B64C 3/385 244/7 A |
| 2013/0020429 A1 | 1/2013 | Kroo | |

* cited by examiner

CONTROL SYSTEM FOR A STOPPED ROTOR AIRCRAFT

CROSS REFERENCE TO OTHER APPLICATIONS

This application claims priority to U.S. Provisional Patent Application No. 62/340,974 entitled STOPPED ROTOR AIRCRAFT filed May 24, 2016 which is incorporated herein by reference for all purposes.

BACKGROUND OF THE INVENTION

Aircraft designs with different intended purposes, for example efficient forward flight versus efficient hovering, have highly differentiated characteristics. Some types of aircraft, such as autogyros and helicopters, are very good at hovering but have poor forward flight performance (e.g., as measured by drag). Other types of aircraft, such as motor-gliders, have good forward flight performance (e.g., motor-gliders tend to have both high lift to drag and low zero lift drag) but cannot hover. New types of aircraft which have both good forward flight and hovering performance would be desirable. For example, to achieve the same flight range and/or flight time, such aircraft consume less power compared to other types of aircraft.

BRIEF DESCRIPTION OF THE DRAWINGS

Various embodiments of the invention are disclosed in the following detailed description and the accompanying drawings.

DETAILED DESCRIPTION

Figure 1A:
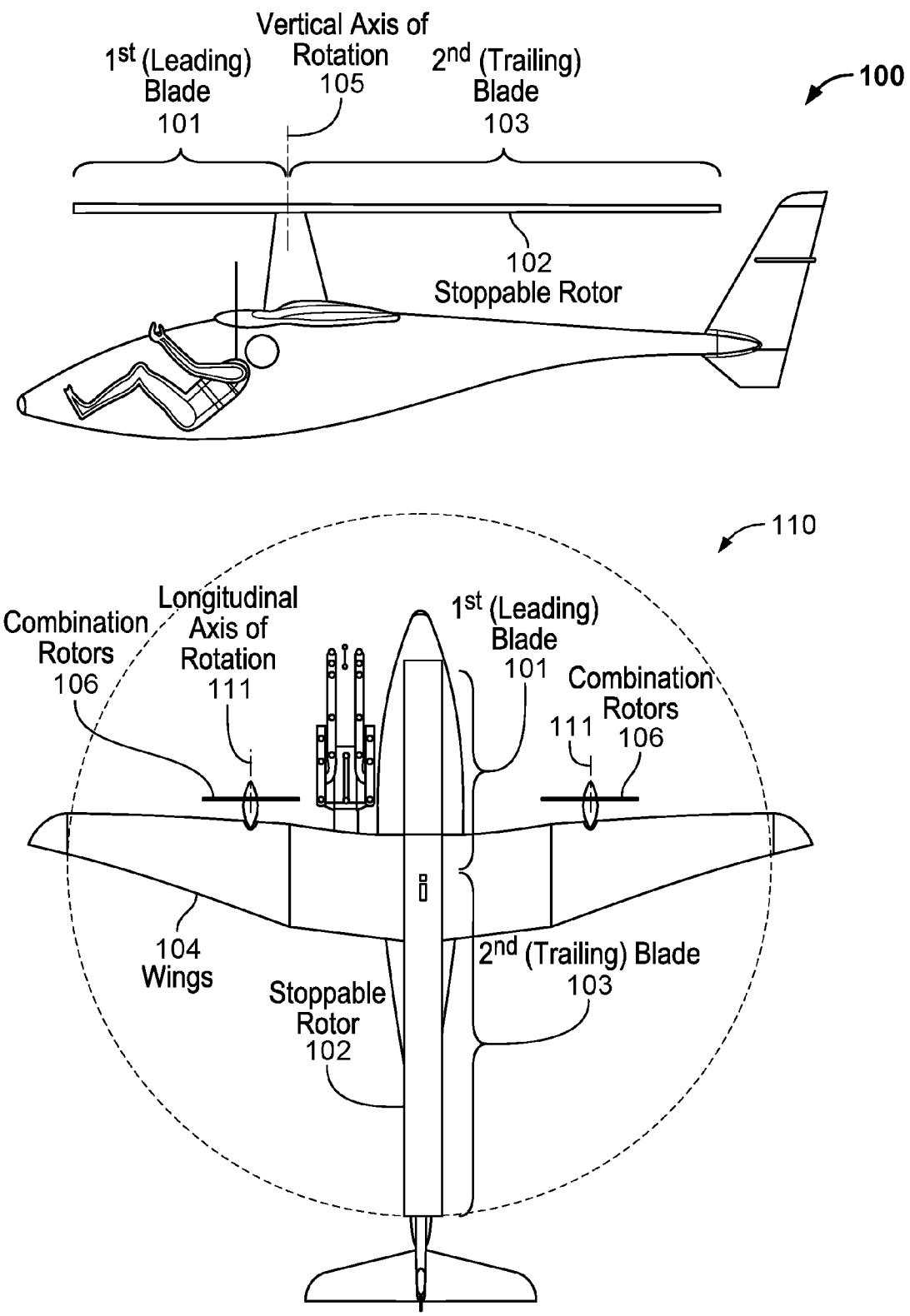
FIG. 1A is a diagram showing a top view and a side view of a stopped rotor aircraft embodiment.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The following figures illustrate various embodiments of and features associated with a control system for a stopped rotor aircraft (e.g., which stops the stoppable rotor when so instructed). In some embodiments, the controller stops a stoppable rotor by calculating, while an aircraft which includes a stoppable rotor is mid-flight, a braking start point associated with the stoppable rotor, where the stoppable rotor includes a first blade and a second blade and the stoppable rotor is configured to rotate about a substantially vertical axis, and also by beginning a stopping process to stop the stoppable rotor, while the aircraft which includes the stoppable rotor is mid-flight, when the stoppable rotor reaches the braking start point, wherein the stoppable rotor is stopped with the first blade pointing forward and the second blade pointing backward. First, some examples of aircraft which use a stoppable rotor (referred to herein as stopped rotor aircraft) and stoppable rotors are described. Then, some examples of processes and/or components associated with stopping the stoppable rotor are described.

FIG. 1A is a diagram showing a top view and a side view of a stopped rotor aircraft embodiment. In the example shown, diagram 100 shows a side view of the exemplary aircraft. For sizing context, a pilot is shown in or adjacent to the aircraft in these diagrams. In this example, the stopped rotor aircraft includes a stoppable rotor (102) which is oriented or otherwise configured to rotate about a substantially vertical axis of rotation (105). The stoppable rotor is capable of stopping (if desired) while the aircraft is mid-flight. For example, a pilot may decide when it is appropriate to stop the stoppable rotor and issue an instruction to that effect. Since rotor 102 is able to stop mid-flight (if desired), rotor 102 is referred to as a stoppable rotor.

Although not necessarily shown here, the stoppable rotor (102) may be optimized for vertical flight, for example, by selecting blade properties for the stoppable rotor (e.g., blade twist, blade pitch angle, etc.) which offer good vertical thrust and/or good vertical lift. Generally speaking, the stoppable rotor (102) is good at and/or optimized for vertical flight.

Diagram 110 shows a top view of the same aircraft as in diagram 100. In this diagram, the stoppable rotor (102) is shown in a stopped position or state which is desired and/or low-drag. As shown here, when the stoppable rotor (102) stops in the desired stop position, the first blade (101) is pointing forward (e.g., over or toward the nose of the aircraft) and the second blade (103) is pointing backward (e.g., over or toward the tail of the aircraft). The first blade (101) and second blade (103) are sometimes referred to herein as the leading blade and the trailing blade, respectively, because of their positions shown here.

When the stoppable rotor (102) is stopped, the position shown here (e.g., with the first blade (101) pointing forward and the second blade (103) pointing backward) may be desirable because it is a low-drag position. For example, the stoppable rotor (102) is typically stopped when the aircraft is in forward flight and during forward flight, the stoppable rotor offers the least drag when the blades are in the position shown. In contrast, if the stoppable rotor were instead stopped with the blades pointing out over the wings, the drag on the aircraft would be greater than the stoppable rotor position shown here.

Similarly, the first blade (101) and second blade (103) of the stoppable rotor (102) have different blade lengths because of desired and/or associated properties when the stoppable rotor (102) is stopped. The stoppable rotor is typically stopped when the aircraft is flying forward and the forward movement of the aircraft could cause the leading blade (101) to tip upwards (and similarly the trailing blade (103) could tip downwards) from the air resistance when moving forward. If the leading and trailing blades were instead of equal length, this is more likely to occur. By making the leading blade shorter than the trailing blade, the blades are more stable about the teeter axis during forward flight when the stoppable rotor (102) is stopped.

In addition to the stoppable rotor (102), the exemplary aircraft also includes combination rotors (106). These rotors are attached to the wings (104) and are configured to rotate about substantially longitudinal axes of rotation (111). The combination rotors are referred to as such because they serve a combination of purposes or functions. When the aircraft is hovering, the lift to keep the aircraft airborne is provided by the stoppable rotor (102). In this first mode of operation, combination rotors 106 act as anti-torque rotors by providing anti-torque to counter the torque produced by the rotation of the stoppable rotor 102. For example, this may include rotating in a direction which counters the torque induced by the stoppable rotor.

When flying forward (e.g., with the stoppable rotor stopped), combination rotors 106 act as forward thrust rotors which provide forward thrust in order to move the aircraft forward to provide the necessary vertical lift to keep the aircraft airborne. This second mode of operation is sometimes referred to as a forward flight mode (e.g., compare to the first mode of operation, which is sometimes referred to as a hovering or vertical flight mode). In this mode, the forward movement of the aircraft from the combination rotors (106) causes airflow over the wings (104) which in turn produces aerodynamic lift forces on the wings (104). In other words, the purpose of the combination rotors in this mode is to move the aircraft forward, as opposed to providing anti-torque.

In various embodiments, the blade properties of the combination rotors (e.g., blade twist, blade pitch angle, etc.) may be selected based on one or both of those desired objects: to provide good anti-torque (e.g., when the stoppable rotor is on) and/or to provide good forward thrust (e.g., when the stoppable rotor is off).

The following figure shows some additional views of the exemplary stopped rotor aircraft.

Figure 1B:
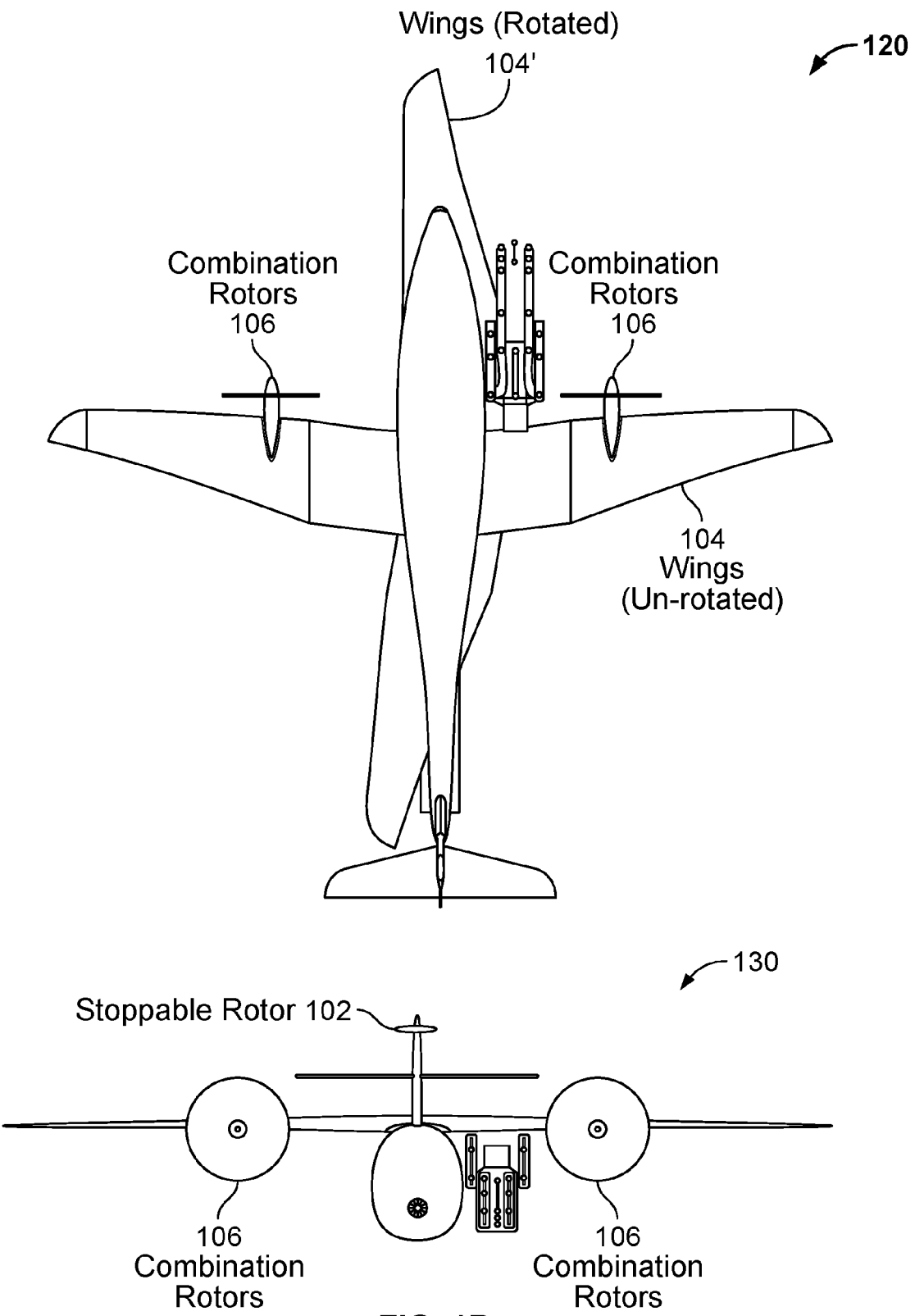
FIG. 1B is a diagram showing a bottom view and a front view of a stopped rotor aircraft embodiment.

FIG. 1B is a diagram showing a bottom view and a front view of a stopped rotor aircraft embodiment. FIG. 1B continues the example of FIG. 1A. Diagram 120 shows a bottom view of the exemplary stopped rotor aircraft. In this diagram there are two copies of the wings: rotated wings 104' (which are rotated to show the wingspan relative to the nose-to-tail length) and un-rotated wings (104). Naturally, the dimensions shown here are merely exemplary and are not intended to be limiting.

Diagram 130 shows a front view of the exemplary stopped rotor aircraft. In the state shown, the combination rotors (106) are rotating about a substantially longitudinal axis whereas the stoppable rotor (102) is off (i.e., not rotating). This front view illustrates the point made above about how the stoppable rotor (102) has low drag when stopped in the position shown. Note, for example, that with one blade facing forward and the other blade facing backward, very little of the stoppable rotor is visible from this view and this corresponds to low drag.

In some embodiments, a stopped rotor aircraft is designed to have glider-like properties. For example, the stopped rotor aircraft may be (e.g., extremely) lightweight and the shape of the fuselage may be optimized for low drag during forward flight. This may permit the stopped rotor aircraft to glide for substantial periods of time, even if both the stoppable rotor and combined rotors are turned off. In some embodiments, a stopped rotor aircraft is built as a single seat aircraft and/or fits within ultra lightweight restrictions.

The exemplary stopped rotor aircraft shown here exhibits excellent forward motion performance, as well as excellent hover performance. For example, when hovering, the stoppable rotor (102) is used to provide both vertical thrust and vertical lift, which the stoppable rotor is very efficient at. The stopped rotor aircraft is also good at forward flight, for example because of the light weight of the aircraft, the aerodynamic shape of the aircraft, and/or the design choices made for the combination rotors (e.g., with good forward motion performance in mind). In contrast, other types of aircraft are good at one type of motion but not the other, or may not even be capable of performing one type of motion at all (e.g., some types of aircraft cannot hover).

Some other types of aircraft may use multiple (e.g., smaller) blades rotating about a substantially vertical axis to provide vertical thrust and vertical lift. The configuration shown here where a single rotor (i.e., the stoppable rotor) is used for vertical thrust and vertical lift may be more attractive because it tends to be more efficient than multiple, smaller rotors (e.g., if the disc area of the single rotor is larger than that of the combination of all smaller rotors in the comparison). This benefit can be increased through the greater Reynolds number of the single rotor (ignoring any lost efficiency due to any in-blade flap mechanism for those embodiments which include flaps). In some embodiments, the stopped rotor aircraft is battery-powered and/or ultra lightweight, so consuming less power is desirable because it reduces the weight of the battery and/or extends the flight range.

Another benefit to using a single rotor for vertical thrust and vertical lift is that it produces less noise and the noise produced is at a lower frequency. In contrast, an aircraft which hovers using multiple rotors with smaller blades will produce more (i.e., louder) noise at a higher (e.g., "buzzing") frequency. To people in the vicinity, the latter is more annoying and so designs with a single rotor for hovering may be preferable to ones with many rotors with smaller blades for hovering.

In various embodiments, a stopped rotor aircraft is able to take off and land on a variety of surfaces (e.g., water, land, etc.). The following figures show some landing gear examples which permit this.

Figure 2:
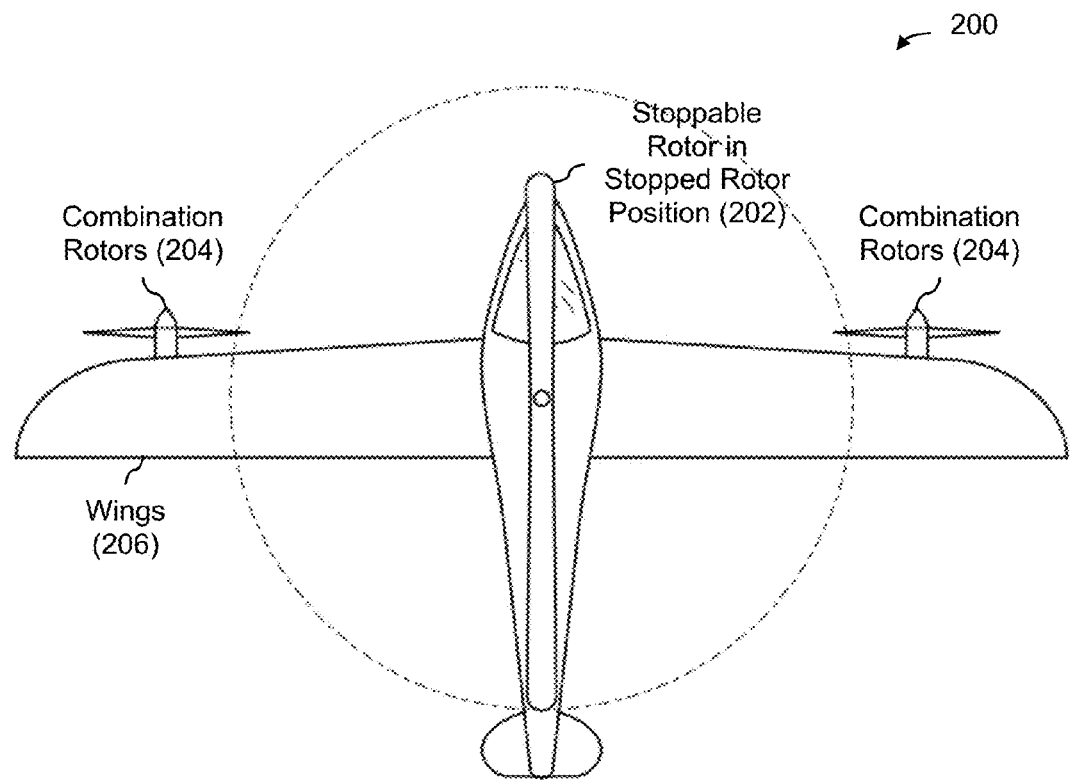
FIG. 2 is a diagram illustrating an embodiment of a stopped rotor aircraft with a foam filled skeg and wheels.
Figure 2:
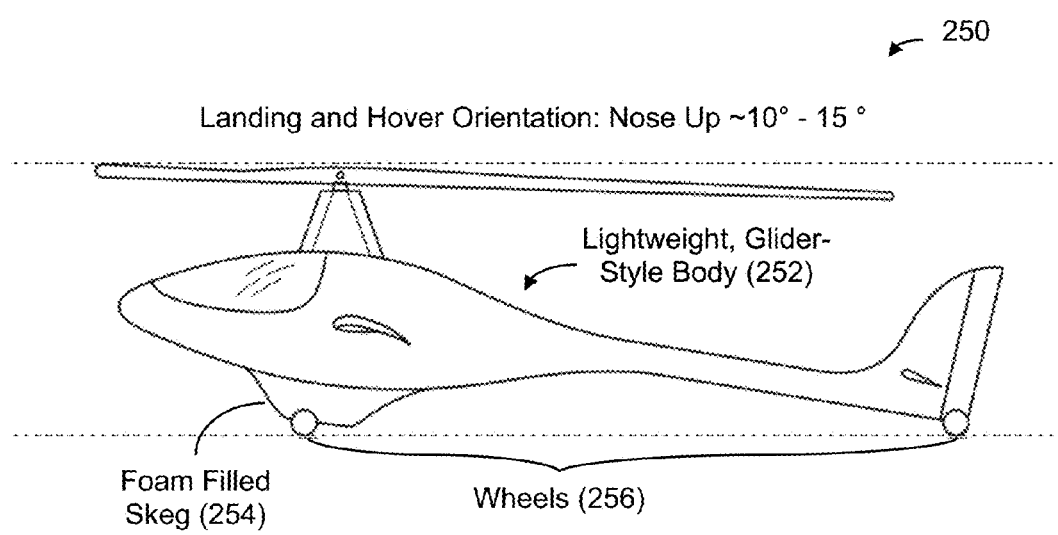

FIG. 2 is a diagram illustrating an embodiment of a stopped rotor aircraft with a foam filled skeg and wheels. In the example shown, the exemplary stopped rotor aircraft is able to take off and land on a variety of surfaces, including land and water, as desired. Diagram 200 shows a top view of the exemplary aircraft which includes a stoppable rotor (202), combination rotors (204), and wings (206).

Diagram 250 shows a side view of the exemplary aircraft. As shown from this view, the exemplary aircraft has a landing and hovering orientation where the nose of the aircraft is up, approximately 10°-15°. This nose up orientation can be retained while avoiding a tail-first landing with use of a skeg (154) on the bottom of the aircraft. The nose up angle also permits the wings to have a better angle during transition both from hover to wing-borne and wing-borne to hover flight, by better aligning flow to the wing and better aligning the rotor for forward acceleration in level orientation. The nose up angle also permits more clearance between the rotor blades and the fuselage of the aircraft.

The skeg (154), which is located at the bottom of the aircraft, in this example is foam filled and provides a crush structure. In the event of an emergency landing, the foam-filled skeg acts as a cushion, absorbing some of the impact. The skeg also permits non-emergency landings on a variety of surfaces. For example, the fin-like shape of the skeg permits the skeg to pierce water more easily for a water landing, if desired. In this example, the aircraft also includes wheels (156) to permit a horizontal takeoff and/or landing on a solid surface, if desired.

It may be helpful to describe a stopped rotor aircraft's operation in various modes or states of operation. The following walks through an example flight from takeoff to landing.

Takeoff

In this example, the aircraft performs a vertical takeoff using stoppable rotor 202 (e.g., where rotor 202 provides sufficient vertical lift to take off). Combination rotors 204 are on to counter the torque induced by stoppable rotor 202 and do not substantially contribute to the vertical lift needed to take off. Naturally, the speed of the stoppable rotor may be adjusted to hover, rise vertically, or descend vertically. In some embodiments, the stoppable rotor includes flaps (not shown here) which are used during takeoff in order to generate high frequency content thrust and cyclic control signal, while the stoppable rotor's angular speed (e.g., in RPM) can be adjusted to achieve low frequency control over hover thrust.

Hover

In the hovering state or mode, the combination rotors (204) are on, rotating in a direction which counters the torque produced by the stoppable rotor (202). An example of this is described in more detail below. In other embodiments, some other rotor or structure may be used to counter the torque produced by the stoppable rotor (202). For example, a flywheel could be decelerated, or an aerodynamic surface such as the rudder or a spoiler can provide the countering torque.

Transition from Hover to Forward Flight

To transition from hovering to forward flight, the stoppable rotor (202) is used to carry the vehicle into forward flight at a flight speed above the stall speed of the aircraft. In other words, even though the stoppable rotor is not necessarily optimized for forward flight, it is used to put the aircraft into this flying mode or position (i.e., moving forwards), which causes airflow over the wings and which in turn causes an aerodynamic lift force on the wings. After this, the stoppable rotor is adjusted to give low lift and the stoppable rotor (202) is quickly stopped after the majority of lift is transitioned to the wing. In some embodiments, a stopped rotor aircraft is glider-like (e.g., very low drag and ultra lightweight) which helps the stopped rotor aircraft transition the lift to the wings. Once stopped, the stoppable rotor remains in the desired stop position with the shorter blade facing forward and the longer blade facing backwards. See, for example, diagram 200.

A variety of processes and/or techniques for stopping the stoppable rotor may be used. In some embodiments, a rotor stopping process becomes unstable at high advance ratios. To avoid the blade diverging from a relatively flat plane, active control can be applied using the flaps on the rotor (for those embodiments which use flaps). This could include, for example, feeding back the teeter axis angular rate on the rotor so as to provide teeter axis damping.

During the transition from hovering to forward flight, the combination rotors (204) switch from countering the torque of the stoppable rotor to providing forward motion. As described above, the stoppable rotor may be slowed down during the transition from hovering to forward flight. When the stoppable rotor reaches a speed where the combination rotors no longer need to counter the torque produced by the stoppable rotor, the combination rotors may switch from providing anti-torque (i.e., countering the torque from the stoppable rotor) to providing forward thrust.

In some embodiments, switching the combination rotors from countering the torque from the stoppable rotor to providing forward movement means switching the direction of rotation (e.g., counterclockwise to clockwise or vice versa). Naturally, the speed of the combination rotors may be adjusted to move forward faster or slower as desired once in forward flight.

In some embodiments, the combination rotors have a smaller amount of thrust when rotating in one direction (e.g., backwards when used for forward flight) compared to another direction (e.g., forwards when used to counter torque from the stoppable rotor). If the thrust is set lower, the inefficiency of spinning backwards will be countered approximately by the efficiency gain of a low disc loading (e.g., thrust per disk area), and the efficiency of this rotor may be matched to that of the forward spinning motors providing anti-torque. That is, running a rotor backwards is inefficient, but this inefficiency can be countered or offset by low thrust or disc loading (e.g., using less thrust) when rotating the combination rotor(s) backwards.

Transition from Forward Flight to Hover

To transition from forward flight to hover, the stoppable rotor (202) is started, increasing rapidly from a stop to its hovering and/or stable angular or rotational speed. As the stoppable rotor rotates faster, more torque will be produced and the combination rotors (204) switch from providing forward motion to providing anti-torque, including by changing a direction of rotation. In some embodiments, a stopped rotor aircraft is glider-like (e.g., very low drag and ultra lightweight) so that the stopped rotor aircraft transition can glide with sufficient lift on the wings, even if all of the rotors are briefly off or are rotating slowly.

Landing

A variety of landings surfaces and direction of landing are supported by the exemplary aircraft shown here. In some embodiments, the aircraft lands vertically by gradually decreasing the speed of the stoppable rotor when hovering. Or, the aircraft may land horizontally on land using the wheels or on water using the foam-filled skeg while in forward flight mode.

In some embodiments, a stopped rotor aircraft is configured for easier (e.g., ground) transport. For example, the wings of a stopped rotor aircraft may be removable from the body. Once separated, the wings and body may then be placed in some trailer (e.g., enclosed or open-air) and towed. Alternately, the wing may be mounted on a swivel such that it can be rotated without any connections being severed, so as to better fit on a trailer. This permits the stopped rotor aircraft to be more easily towed due to the smaller width once the wings and body are separated. In some embodiments, the wings rotate (e.g., on some hinge) so that the wings run parallel to the body of the aircraft to achieve a narrower width for easier transport.

In some embodiments, a stopped rotor aircraft includes dedicated anti-torque rotors. The following figure shows one such example.

Figure 3:
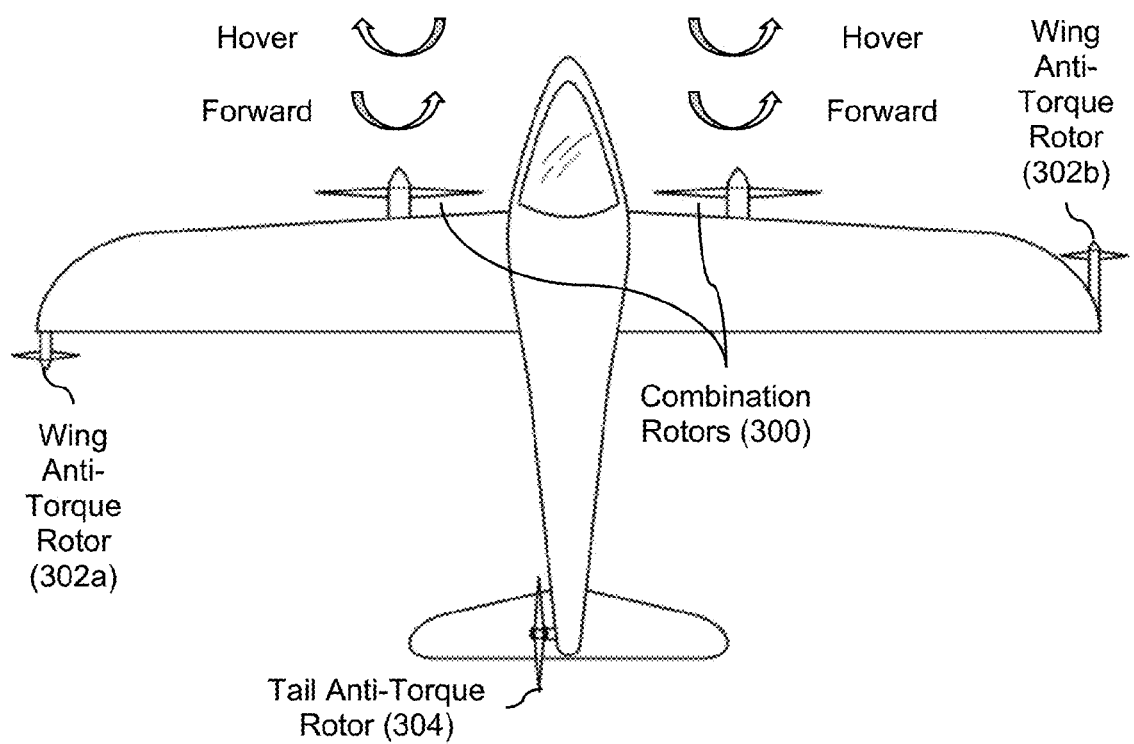
FIG. 3 is a diagram illustrating an embodiment of a stopped rotor aircraft with dedicated anti-torque rotors.

FIG. 3 is a diagram illustrating an embodiment of a stopped rotor aircraft with dedicated anti-torque rotors. In this example, a different number and/or arrangement of rotors for forward flight versus anti-torque is shown compared to the previous examples. For clarity, the stoppable rotor on top of the aircraft is not shown in this figure.

In this example, the aircraft has rotors which are dedicated anti-torque rotors which are not used to provide forward movement or forward thrust. Two such rotors are mounted on the wings (i.e., wing anti-torque rotors 302a and 302b) and one is on the tail (i.e., tail anti-torque rotor 304). Since these are dedicated anti-torque rotors, these rotors only rotate during hover when the stoppable rotor (not shown) is rotating. During forward flight (e.g., when the stoppable rotor is stopped), anti-torque rotors 302a, 302b, and 304 do not rotate.

Unlike the dedicated anti-torque rotors, the combination rotors (300) operate during hover as well as forward flight. This figure illustrates the directions in which combination rotors 300 rotate (at least in this example). When hovering, the combination rotors (300) rotate in opposite directions (i.e., to provide anti-torque) and during forward flight they rotate in the same direction.

As shown here, a stopped rotor aircraft may include any number and/or arrangement of combination rotors, dedicated anti-torque rotors, and/or dedicated forward flight rotors.

The following figure shows an example of the mechanical components which connect a stoppable rotor to the rest of the aircraft.

Figure 4:
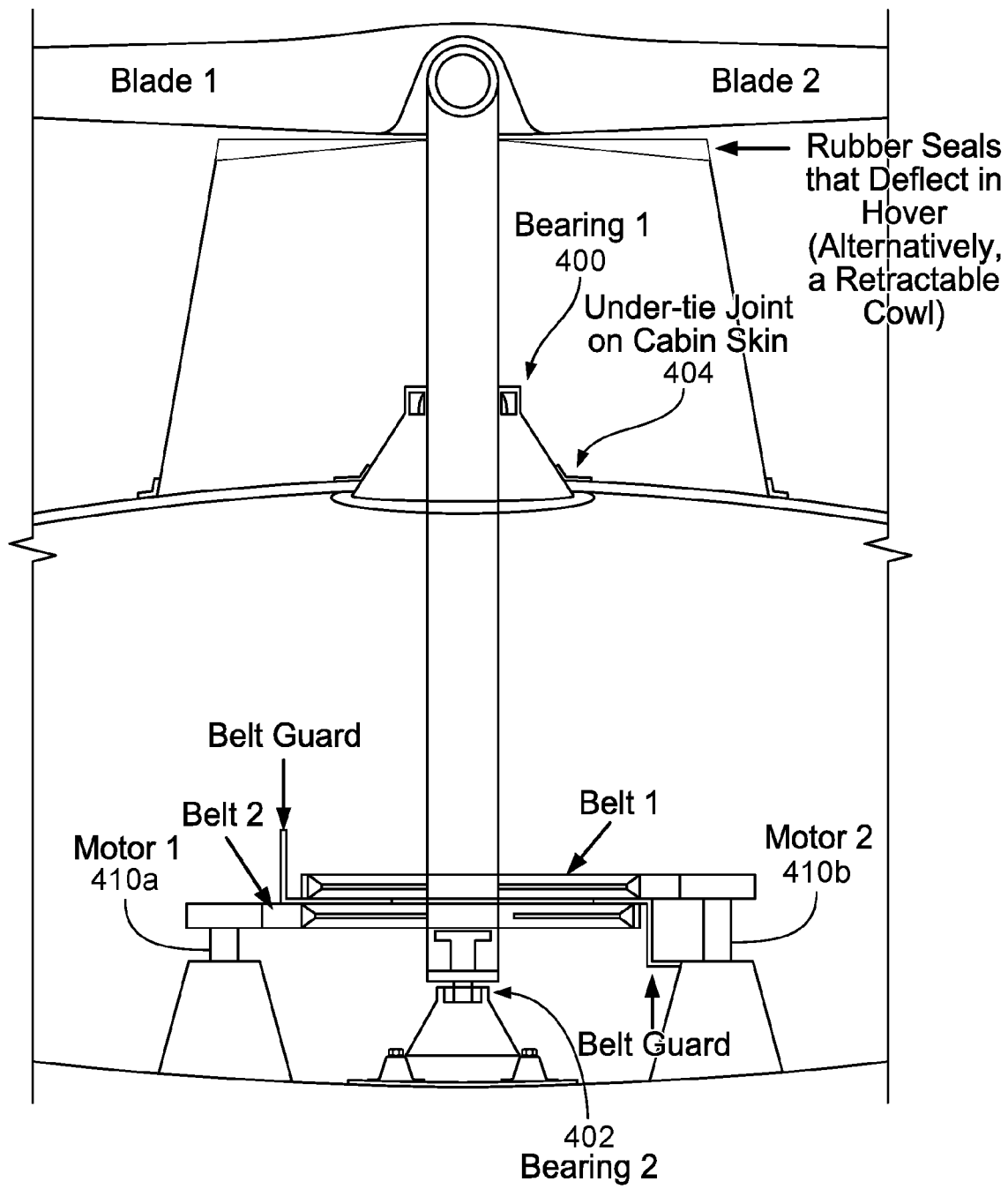
FIG. 4 is a diagram illustrating an embodiment of mechanical components which connect the stoppable rotor to the rest of the aircraft.

FIG. 4 is a diagram illustrating an embodiment of mechanical components which connect the stoppable rotor to the rest of the aircraft. In the example shown, the upper bearing (400) provides a cupola type support for the break in the skin while the upper bearing can be a spherical plain type for lower mass and lower tolerance. In the example shown, bearing 1 (400) is plain, having a surface speed of approximately 1 m/s. However, similar designs may be made and in particular, if the driveshaft is made of steel, roller bearings can be used with a minimum of weight.

Because of the lightweight nature of the stoppable rotor, in various embodiments, the rotor inertia is extremely low. As such, in the event of a power outage there may be very little time for the pilot to react and start autorotation. There also may be very little time to flare. To address this, in the example shown here, the lift thrust is split into two motors (410a and 410b), each of which is capable of either hover or a slow descent where the two motors are fully independent. An alternate embodiment is to split the motor into more than three windings. For example, a six winding motor with two independent motor controllers would provide redundancy for a majority of failure cases. Because of the small amount of power used in hover, it is reasonable to put a separate battery on each (not shown here) and to allow it to charge at a slow rate of descent. For example, for a desired $T/W \approx 1.2$ at maximum takeoff weight, we should expect a torque limited drive system to deliver about 75% of hover thrust, with the rest needing to come from autorotation for forward flight. Given that many electric motors are capable of momentary overloads, a flight path on landing may be planned for which does not require hover thrust for a significant time or outside of ground effect, while paying very little penalty in mass for the complete redundancy. If a lift fan motor is already out while in forward flight, it may be desirable for the pilot to perform a horizontal landing on a runway if possible.

In some embodiments, the underside of one of the blades has a reflective patch or some other variety of zero crossing indicator. In some embodiments, this reflective patch is used to detect when the blades are in some desired stop position (e.g., with the leading blade facing forward and the trailing blade facing backward) or to calibrate an estimate of the rotational angle of the stoppable rotor. In one example, a stationary light, shining upwards, is positioned to hit the reflective patch when the stoppable rotor is in the desired stop position. By detecting the reflection from the patch, it is possible to detect when the stoppable rotor has stopped in the desired stop position. In some embodiments, when the stoppable rotor is moving (e.g., during hover mode), the reflective patch is used as a tachometer. In an alternate embodiment, the rotor shaft may have an encoder that would be used to detect blade angle and control the blade to a desired stop location over a pre-planned torque, speed, or position profile. In another alternate embodiment, a desired torque profile is used as a basis for stopping motion control, and a feedback loop is closed over this to force the rotor to stop at a desired rotation angle.

Typical rotors are not designed to stop mid-flight. For example, the rotors of a helicopter do not stop until the helicopter lands. The following figures illustrate more detailed examples of a stoppable rotor which is designed to stop mid-flight and which may be used by a stopped rotor aircraft.

Figure 5:
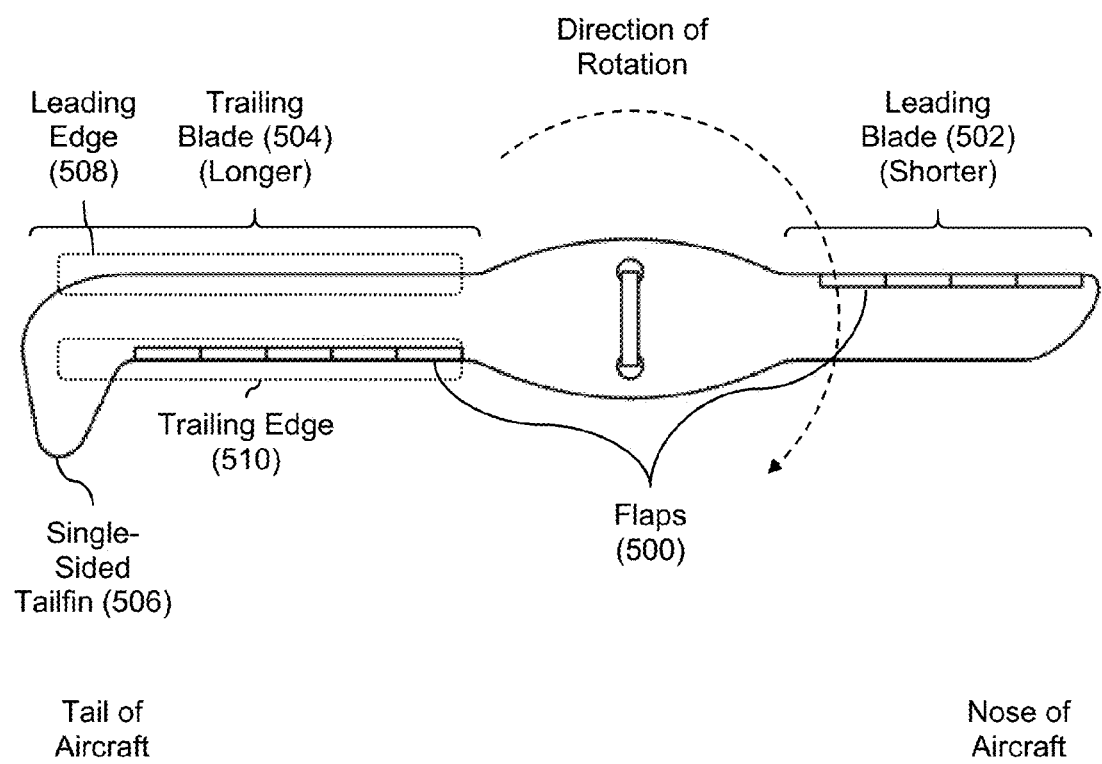
FIG. 5 is a diagram illustrating an embodiment of a stoppable rotor with flaps and a single-sided tailfin.

FIG. 5 is a diagram illustrating an embodiment of a stoppable rotor with flaps and a single-sided tailfin. In this example, to make starting and stopping the stoppable rotor easier while flying, the leading blade (502) and trailing blade (504) and other parts of the stoppable rotor are relatively low-inertia (i.e., lightweight). This makes the blades easier to start and stop. Lighter blades not only reduce total vehicle weight, they also allow for angular rate (e.g., RPM) control of thrust and reduce the need for collective control range on the flaps.

The flaps (500) are used to control or otherwise adjust the blades of the stoppable rotor, for example when in hover mode. In this particular example, both the trailing blade (504) and the leading blade (502) have flaps. Alternatively, in some embodiments, only one of the blades have flaps or no flaps are used and the rotor is stopped using other components. When a collective, cyclic, blade pitch or other command is given that would change rotor output force or moments, the flaps are used as a primary flight control to enact the change in output force and/or moment. For example, a cyclic command would become a sinusoidal command on the flaps. Each flap can (if desired) be commanded independently to an optimal angle to maximize rotor efficiency over the set of commands, or they can be commanded in some simplistic mixed control manner such as duplication of the same command to every servo on a blade.

When stopping the stoppable rotor (e.g., when transitioning from hovering to forward flight), the flaps may be used to control blade pitch and minimize the instability of the rotor blade at the transient high advance ratios seen during the stopping procedure. When the stoppable rotor has stopped, the flaps may be returned to a neutral position to minimize drag during forward flight and to minimize energy used.

The tailfin (506) of the trailing blade causes the stoppable rotor to retain a level pitch or teeter attitude when the aircraft is in a forward mode of flight, while the stoppable rotor is stopped and the leading blade is pointing forward and the trailing blade is pointing backward. The tailfin (506) helps to maintain a level position when the stoppable rotor is stopped in the following manner. If the trailing blade (e.g., at a stop and facing backwards) were to tip downward, the tailfin would exert a greater righting moment than the leading blade would exert an anti-righting moment. The greater upward force on the tail plane causes the rotor to return to a neutral angle and results in static stability. The long moment arm from the teeter pivot location to the tailfin results in a large pitch rate damping term which is helpful for producing dynamic stability. This behavior correction causes the stoppable rotor to remain substantially stable and in the level plane when stopped during forward flight.

In some embodiments (not shown here), the rotor has only one blade, specifically the trailing blade, which is balanced by a counter-weight instead of a leading blade during hovering and transitioning flight. For example, a stoppable rotor with a single blade may be more efficient (but at the cost of more vibration).

In this example, the tailfin (506) is a single-sided tailfin. The exemplary stoppable rotor shown here is designed to rotation in the clockwise direction, such that the tailfin is designed to remain in the wake of the stoppable rotor as it rotates. To put it another way, the tailfin extends outward from the trailing edge (508) of the trailing blade but does not extend outward from the leading edge (510) of the trailing blade. In some embodiments, a stoppable rotor includes a double-sided tailfin. The following figure shows one such example.

Figure 6:
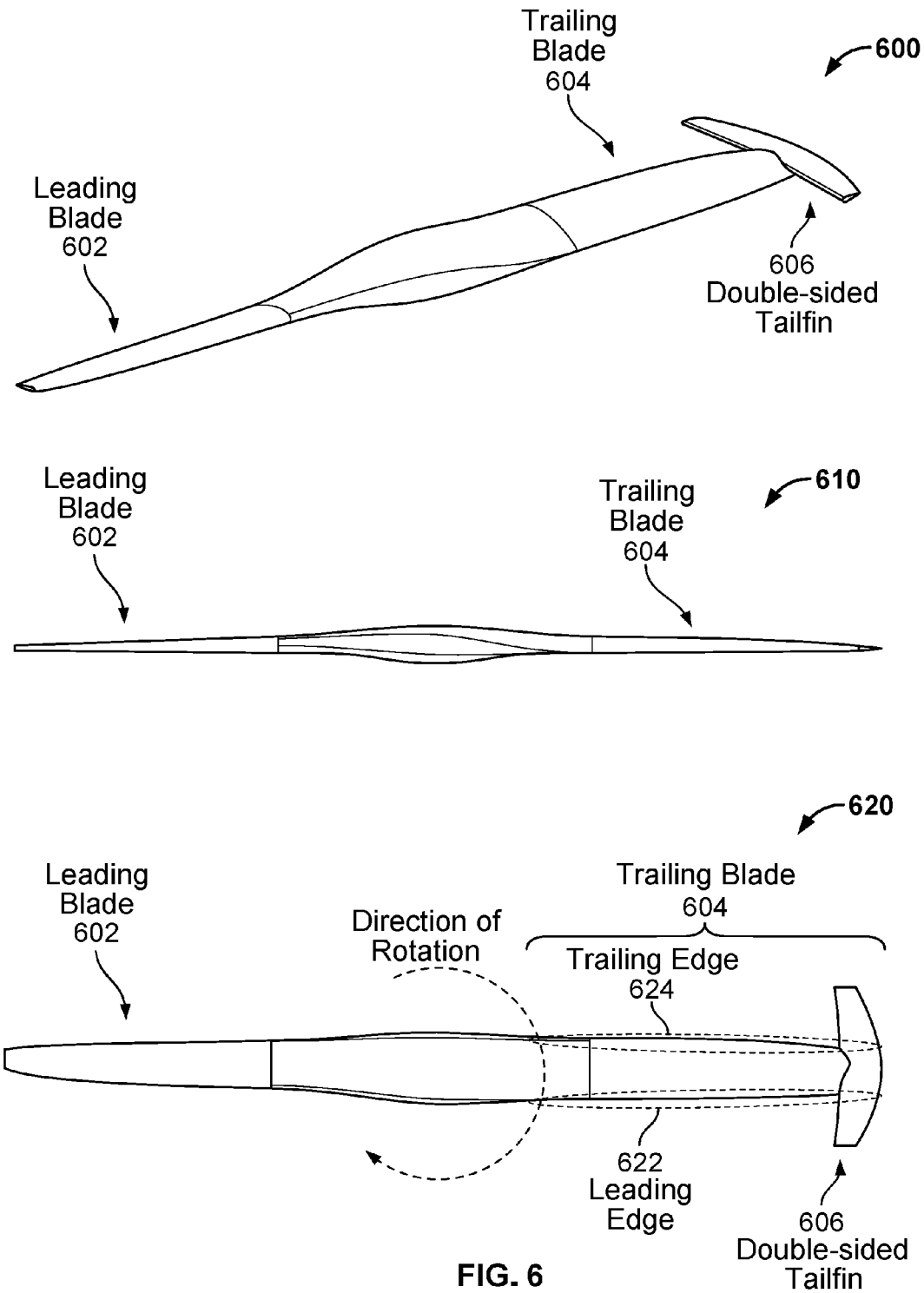
FIG. 6 is a diagram illustrating an embodiment of a stoppable rotor with a double-sided tailfin.

FIG. 6 is a diagram illustrating an embodiment of a stoppable rotor with a double-sided tailfin. In this example, diagram 600 shows an angled view, diagram 610 shows a side view, and diagram 620 shows a top view. In this particular example, the tailfin (606) has two sides: one side which extends outward from the leading edge (622) of the trailing blade and another side which extends outward from the trailing edge (624) of the trailing blade. In contrast, the tailfin shown in FIG. 5 only has a single side or protrusion.

From the views shown, it is clear that the tailfin remains substantially within the plane created by the leading blade and trailing blade. In other words, the tailfin is not a vertical tailfin (e.g., which would be in a second plane perpendicular to a first plane which includes the leading blade and trailing blade).

As is shown in this example, tailfins (and, more generally, stoppable rotors) encompass a variety of embodiments. It is noted that the figure is not necessarily to scale and the leading blade (602) and trailing blade (604) are not necessarily the same length even though they may appear to be so in this drawing.

In some embodiments, a stoppable rotor does not include a tailfin and some other features are used to correct the stoppable rotor if it leaves a level plane. For example, the trailing blade may be made wider than the leading blade. This may cause similar corrective forces which would cause the trailing blade (e.g., when stopped and facing backwards during forward flight) to be pushed back down when tilted up and to be pushed back up when tilted down. Naturally, asymmetric blade widths may be a design feature used even when there is a tailfin.

The following figure illustrates an embodiment of components associated with a stoppable rotor.

Figure 7:
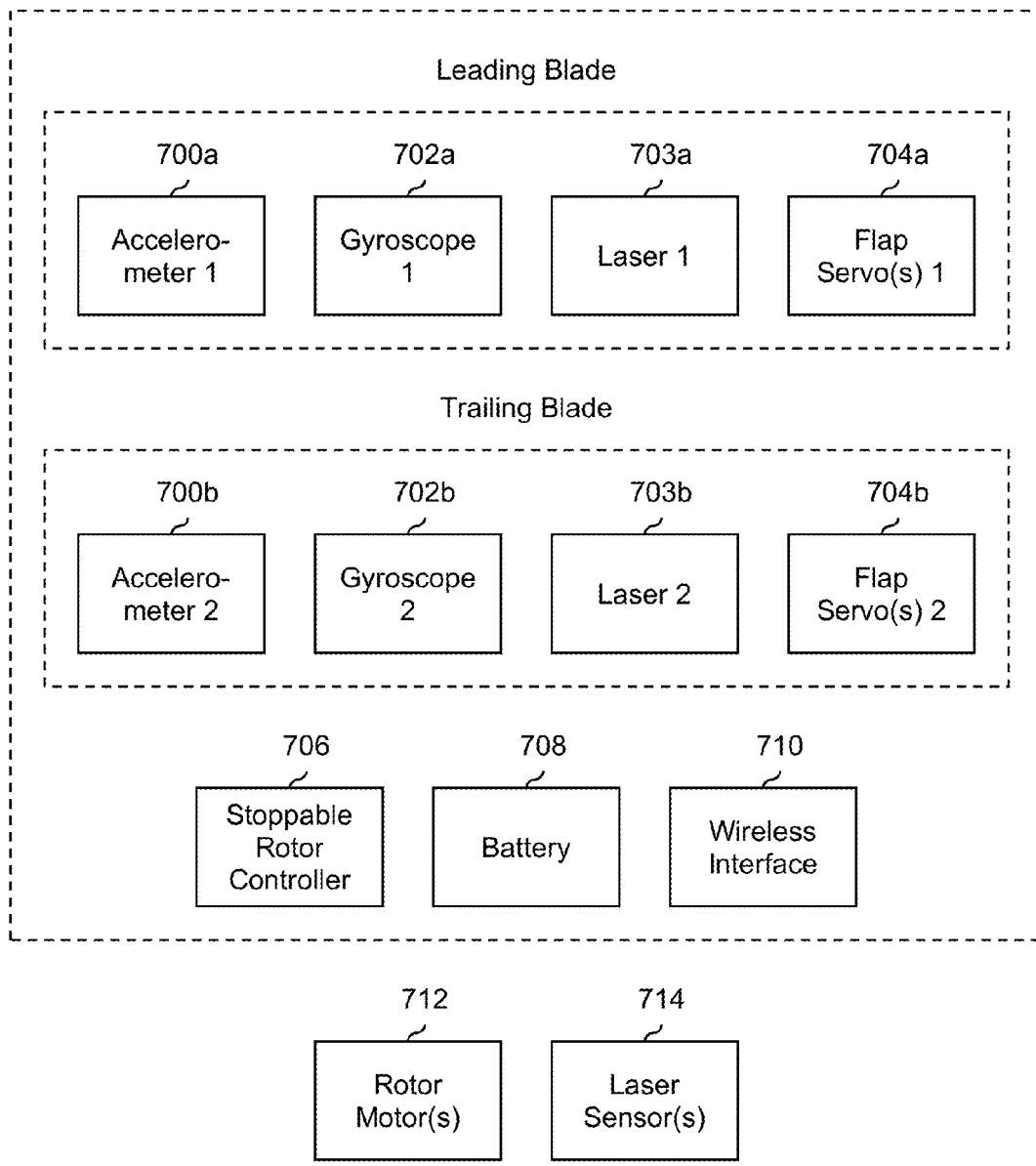
FIG. 7 is a diagram illustrating an embodiment of components associated with a stoppable rotor.

FIG. 7 is a diagram illustrating an embodiment of components associated with a stoppable rotor. In this example, the first accelerometer (700a), first gyroscope (702a), and first set of flap servo(s) (704a) are located in the leading blade of a stoppable rotor and the second accelerometer (700b), second gyroscope (702b), and second set of flap servo(s) (704b) are located in the trailing blade. It is noted that although the two blades have duplicate and/or matching components in this example, in some embodiments a component is only included in one of the blades (e.g., there may be only one accelerometer, only one laser, etc.), for example to reduce the weight of the aircraft. In some other applications, the additional weight from the duplicates is acceptable for redundancy reasons.

The accelerometers (700a and 700b) and gyroscopes (702a and 702b) are used to respectively measure acceleration (e.g., degrees per second squared or radians per second squared) and angular rate (e.g., degrees per second or radians per second) in their respective blade. The blades also include lasers (703a and 703b) which emit beams which point downward from the bottom of the blades to the rest of the aircraft so that as the stoppable rotor rotates, the beams trace a circle. One or more laser sensors (714) are attached elsewhere on the aircraft (e.g., to the base of the stoppable rotor, to the fuselage, or other location which does not rotate with the stoppable rotor) and intersects the paths traced by the beams. This permits the rotational angle (e.g., in degrees or radians) of the stoppable rotor to be known when the beams cross the laser sensors (e.g., where the number of known crossings and/or data points can be adjusted by changing the number of lasers and/or sensors). Between these known crossings, an estimate of the rotational angle may be corrected as/if needed. Other path crossing techniques, such as a light beam and a reflective patch which reflects back the light beam, may be used.

The flap servo(s) (704a and 704b) are used to position the flaps in their respective blade. In one example, the flaps are raised or lowered to slow down the stoppable rotor. The flaps may be raised or lowered at some other desired time and/or for some other purpose (e.g., while the stoppable rotor is rotating). When the stoppable rotor has stopped, the flaps may be put into a neutral position. It is noted that although both blades have flaps in this example, some other embodiments may be configured differently (i.e., they do not have flaps) and the flap servo(s) may not be necessary.

Generally speaking, stoppable rotor controller 706 acts as the controller for the other components shown here. Instructions (e.g., issued by the pilot and/or flight computer) are passed from wireless interface 710 to stoppable rotor controller 706 which parses the instruction to determine which component the instruction is directed to. The instruction is then passed to the appropriate component. If there is any return data (e.g., an orientation reading from one of the accelerometers, or an acceleration reading from one of the gyroscopes), then that data is passed from the relevant component to stoppable rotor controller 706 to wireless interface 710 and back to the pilot and/or flight computer over the wireless channel.

In this example, the blades are sealed off in the stoppable rotor during flight. As such, there are no wires into the exemplary stoppable rotor to supply power and power is supplied by battery 708. In various embodiments, battery 708 may be recharged in a variety of ways. In some embodiments, stoppable rotor can be opened up, exposing battery 708 and permitting battery 708 to be charged and/or replaced with a charged battery. For example, the stoppable rotor may have some screws which keep some panel (e.g., covering the battery) closed. In applications where the battery life is relatively long and/or a tight(er) seal is desired, this may be attractive. Alternatively, the stoppable rotor may have some battery charging port or other opening (e.g., protected by some rubber plug during flight) into which a charger is inserted when the stoppable rotor is not in use. This may be attractive in applications where the battery needs to be recharged relatively frequently and/or opening up the stoppable rotor is inconvenient. Alternately, some stoppable rotor systems may have a slip ring which is used to carry power and/or signal onto the blade, or in which a pneumatic control signal is used to achieve a given control and no electronics live on the blade. These embodiments may be desirable in environments with high electromagnetic noise and/or on vehicles where the rotor will be used at a high duty cycle and recharging of the blade is deemed too onerous for operations.

Since some of the components shown here are sealed off during flight, wires are not used to communicate with the components in the sealed housing(s). Rather, wireless interface (710) is used to communicate with (as an example) a flight computer and/or some pilot. For example, suppose that the aircraft is manned by a pilot. The cabin will have a counterpart wireless interface (not shown) which sends the pilot's instructions from the cabin (e.g., possibly via a flight computer) to wireless interface 710 and from there on to stoppable rotor controller 706 and any other relevant components (e.g., if it is an instruction to move or otherwise position the flaps, then stoppable rotor controller 706 will communicate with the appropriate servo(s)).

Some example wireless technologies which may be employed (depending upon the application, as described above) include a variety of regulated and unregulated wireless communication technologies, including (but not limited to) infrared, radio, etc.

In some embodiments, wireless interface 710 includes security features to protect the stopped rotor aircraft from being commandeered by some other pilot and/or flight computer either inadvertently or intentionally. For example, the two wireless interfaces may use encryption (such as public key encryption) to communicate. With public key encryption, neither side can be "spoofed" by another device, even over a wireless communication channel where all transmissions are observable. Alternately, the level of signal and the minimum threshold of receiving, or a narrow receiving angle mode of communication could be used. For example, a well shaded laser point to point interface or a capacitatively coupled set of coils may be used. Alternately, communications may occur over either an electrical or optical slip ring.

During normal operation (e.g., when wireless communication with the pilot and/or flight computer is available), stoppable rotor controller 706 may follow the instructions of the pilot and/or flight controller. In one example, the pilot and/or flight controller can specify any of the following instructions to stoppable rotor controller 706 (e.g., via wireless interface 710) and stoppable rotor controller 706 will pass on the instruction to the appropriate component and adjust that component as needed (e.g., to achieve the desired value specified by the pilot and/or flight controller): position the flap(s) using the flap servo(s) (e.g., specified as an angle, such as −90° through 90°), measure acceleration in using the accelerometer(s), measure angular speed using the gyroscope(s).

Other instructions or controls may be controlled externally by components outside of the sealed compartment and as such as not passed wirelessly to the stoppable rotor. For example, one or more rotor motor(s) (712) apply torque (e.g., negative (e.g., to slow or stop the stoppable rotor), zero (e.g., when the stoppable rotor is stopped), or positive (e.g., during hover)) to the stoppable rotor. Returning briefly to FIG. 1A and FIG. 1B, the exemplary stoppable rotor (102) shown there is relatively large and in some embodiments multiple smaller motors (e.g., which are designed for smaller rotors with shorter blades) may be used. In some embodiments, using multiple (e.g., smaller) motors to rotate the stoppable rotor is more attractive compared to using a single (e.g., larger) motor because the total torque-to-weight or torque-to-power consumption ratio is better and/or because it offers better redundancy.

Returning to FIG. 7, in some embodiments, if the wireless connection is lost, the rotor controller goes through some sequence of emergency procedures. To detect when the wireless connection goes down, in some embodiments, the wireless interface (710) tracks the last time a transmission was received from the counterpart wireless interface via which communications are exchanged with the pilot and/or flight controller (e.g., in the cabin or on the ground). To ensure that transmissions occur at some minimum frequency (e.g., in case there is some quiet period where neither side needs to exchange information), both wireless interfaces send beacons or pings at some predefined or otherwise specified frequency. If the amount of time since that last transmission was received exceeds some threshold, the stoppable rotor controller (706) will assume it has lost communication with the pilot and/or flight controller.

In one example, since wireless communication has range limitations and because uncontrolled forward flight may cause the aircraft to run into something, when the rotor controller determines that communication has been lost, the rotor controller configures the stoppable rotor for hovering. For example, the rotor controller puts the flaps into a neutral position (e.g., neither up nor down) by specifying neutral positions to the first and second set of flap servo(s) (704*a* and 704*b*). By putting the stoppable rotor into a hovering configuration, it is hoped that the aircraft will not go out of range of the other wireless interface and/or the aircraft will not collide with something.

It is noted that since the rotor motor(s) (712) which control the rotation of the stoppable rotor are outside of the sealed compartment, the rotor controller cannot start the rotor motor(s) which drive the stoppable rotor (if needed) when in a lost communication state. In some embodiments, wireless interface 710 emits a wireless signal indicating that the stoppable rotor is in a lost communication state (e.g., just in case it is merely the receive capability of wireless interface 710 which is not working, or wireless interface 710 is less sensitive than the counterpart wireless interface). In some embodiments, the stoppable rotor issues some external, visual signal. For example, the rotor controller may turn on an external light, indicating that the stoppable rotor is in a lost communication state (e.g., a first color for normal operation, a second color for the lost communication state, and a third color for an emergency state). Such indications may enable a pilot and/or a flight computer to know that the stoppable rotor is in a lost communication state and is switching (if needed) to hovering. This may signal to the pilot and/or flight computer to take appropriate action (e.g., turn on the rotor motor(s) which drive the stoppable rotor).

The following figures illustrate some examples associated with stopping a stoppable rotor and/or maintaining a desired stop position once the stoppable rotor has stopped. First, an example of a process to stop the stoppable rotor is described. Then, since the stoppable rotor can become unstable as it slows down to a stop or even once it has stopped, example processes for detecting such an instability as the stoppable rotor slows down or an out-of-position condition once the stoppable rotor has stopped are described.

Figure 8:
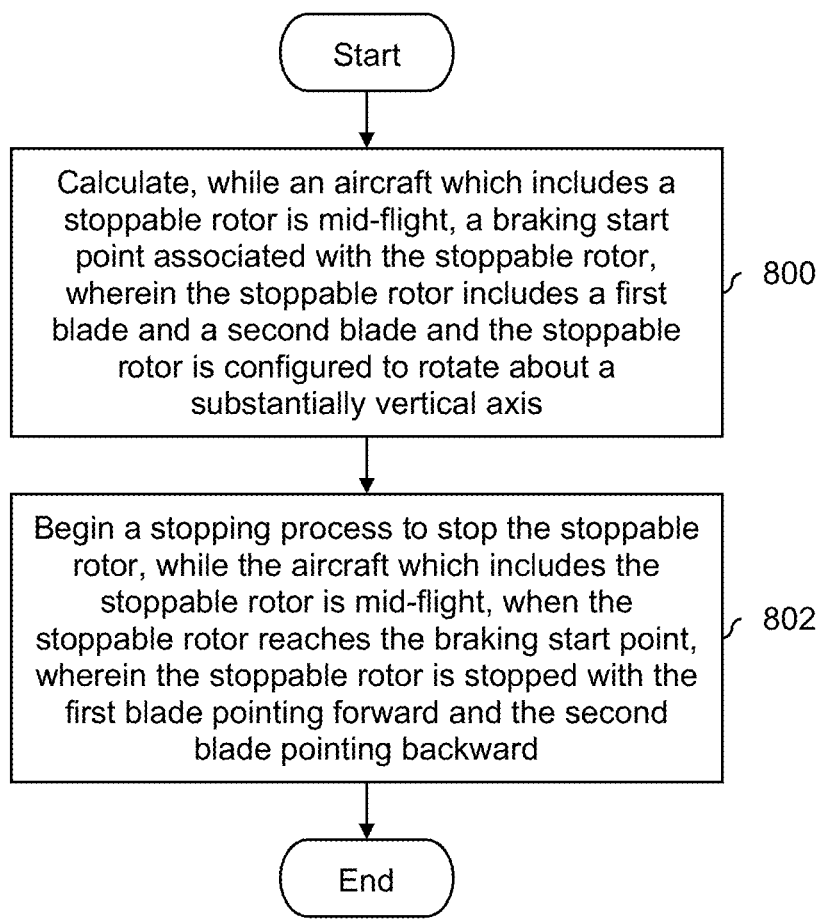
FIG. 8 is a flowchart illustrating an embodiment of process to stop a stoppable rotor.

FIG. 8 is a flowchart illustrating an embodiment of process to stop a stoppable rotor. In some embodiments, the process is performed when the aircraft is transitioning from hovering to forward flight and the stoppable rotor needs to be stopped (e.g., in order to reduce the drag when flying forward). In some embodiments, the process is performed by stoppable rotor controller 706 in FIG. 7.

At 800, while an aircraft which includes a stoppable rotor is mid-flight, a braking start point associated with the stoppable rotor is calculated, wherein the stoppable rotor includes a first blade and a second blade and the stoppable rotor is configured to rotate about a substantially vertical axis. Generally speaking, the braking start point is a point at which braking or stopping of the stoppable rotor begins (e.g., with the intention of bringing the stoppable rotor to a stop, as opposed to just slowing the stoppable rotor down). In various embodiments, the braking start point may be expressed as a time (e.g., a time at which to begin applying negative torque in order to stop the rotor) or as an angle (e.g., an angle, in advance of some desired stop position, at which to begin applying negative torque).

In some embodiments, step 800 is performed continuously and/or in real-time while the stoppable rotor is rotating. For example, if the stoppable rotor rotates faster, then the braking start point will need to begin sooner to compensate. Or, if there are strong crosswinds, then the braking start point may need to begin sooner to compensate for that. By performing step 800 continuously and/or in real-time, this permits the system to always have an up-to-date braking start point, even as the speed of the stoppable rotor changes and/or as environmental conditions change.

At 802, a stopping process to stop the stoppable rotor is begun, while the aircraft which includes the stoppable rotor is mid-flight, when the stoppable rotor reaches the braking start point, wherein the stoppable rotor is stopped with the first blade pointing forward and the second blade pointing backward. For example, when the braking start point is reached, a negative torque may begin to be applied using rotor motor(s) 712 in FIG. 7. The position of stoppable rotor 102 in FIG. 1A shows an example of a desired stop position where one blade is pointing forward and another blade is pointing backward.

The following figure illustrates an example of a state machine associated with a stoppable rotor controller. This state machine may be helpful in understanding the process of FIG. 8, as well as other examples.

Figure 9:
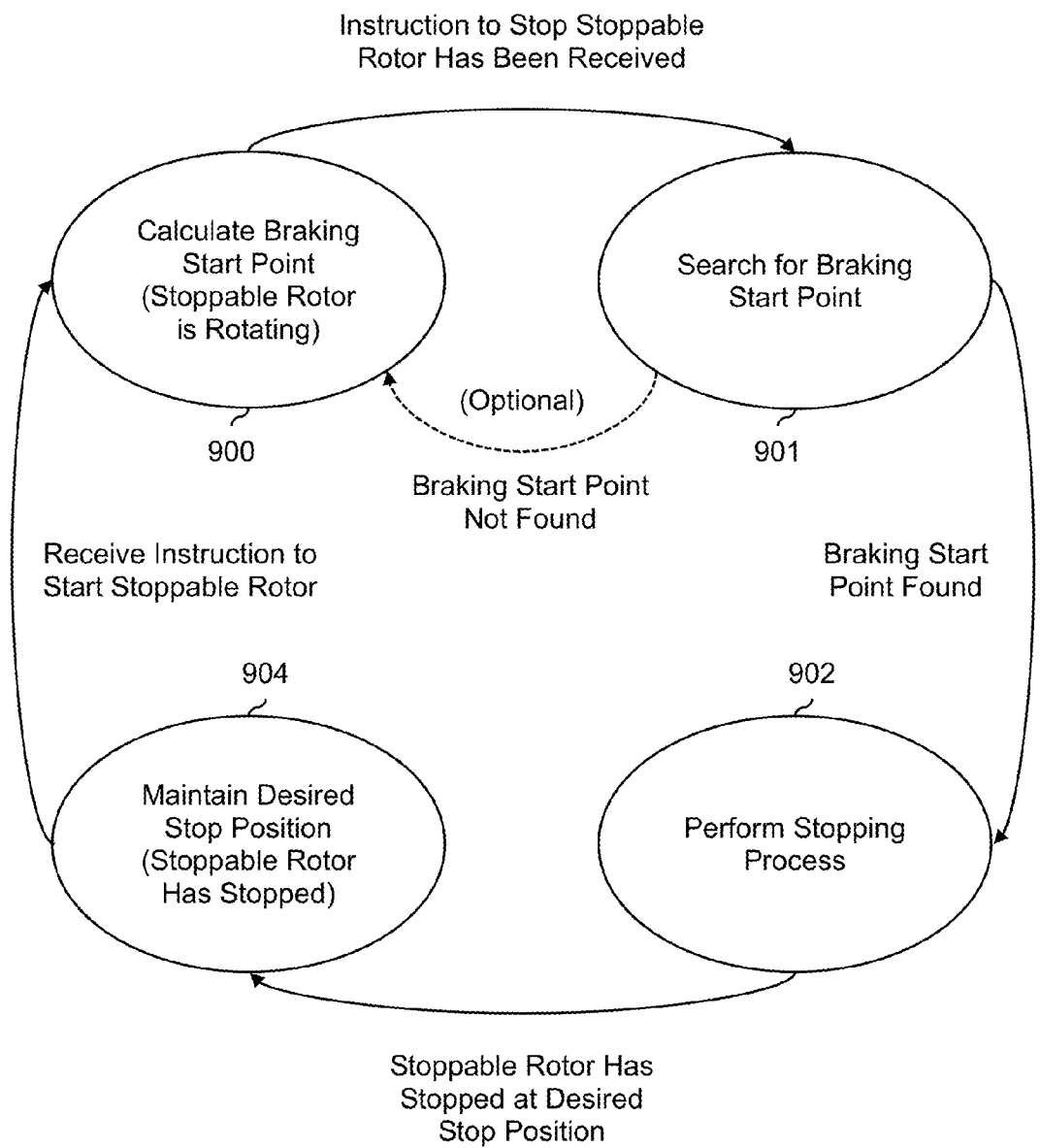
FIG. 9 is a diagram illustrating an embodiment of a state machine associated with a stoppable rotor controller.

FIG. 9 is a diagram illustrating an embodiment of a state machine associated with a stoppable rotor controller. In some embodiments, stoppable rotor controller 706 in FIG. 7 goes through the following states. The states shown may be primarily concerned with starting and stopping the stoppable rotor and other tasks or responsibilities not directly associated with starting or stopping the stoppable rotor are not necessarily shown here (e.g., adjusting the angular rate of the stoppable rotor while hovering, in response to a pilot's instructions).

At state 900, the stoppable rotor controller is in a state where it is calculating the braking start point. At this time, the stoppable rotor is rotating and as described above, the braking start point may be calculated continually and/or in real-time. In the context of FIG. 8, step 800 is performed during state 900.

If an instruction to stop the stoppable rotor is received, the stoppable rotor controller switches to state 901 where the process searches for the braking start point. For example, the stoppable rotor controller may be "armed" and examines the rotational angle of the stoppable rotor, looking for the braking start point so that the stopping process can be triggered.

Once the braking start point is reached, the stoppable rotor controller switches to state 902 where a stopping process is performed. In the context of FIG. 8, step 802 is performed during state 900. An example of a process to detect an unstable position while the stoppable rotor is coming to a stop is described in more detail below.

Once the stoppable rotor has stopped at the desired stop position, the stoppable rotor controller switches to state 904 where the desired stop position is maintained. In this state, the stoppable rotor has stopped. An example of a process to maintain the desired stop position (e.g., to compensate for any shifting or moving of the stoppable rotor) is described in more detail below.

If an instruction to start the stoppable rotor is received, the stoppable rotor controller switches to state 904 where the braking start point is calculated.

While the stoppable rotor controller is in state 902, the stoppable rotor may enter an undesirable and/or unstable position or state when it is slowing down to a stop. The following illustrates an example of such an undesirable position.

Figure 10:
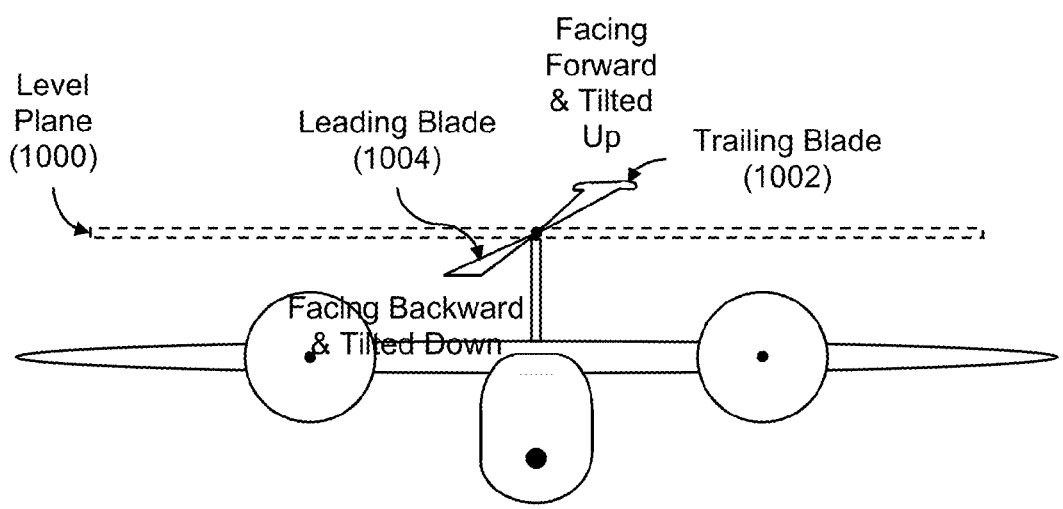
FIG. 10 is a diagram illustrating an embodiment of an undesirable position which may occur when a stoppable rotor is coming to a stop.

FIG. 10 is a diagram illustrating an embodiment of an undesirable position which may occur when a stoppable rotor is coming to a stop. In the example shown, plane 1000 shows a level plane in which the stoppable rotor ideally or preferably rotates and stops. This is the preferred plane because it is a neutral plane and is the most stable. For clarity, some elements of the aircraft are not shown (e.g., a tail).

Sometimes when the stoppable rotor is slowing down, as the trailing blade (1002) comes around to the front of the aircraft, the trailing blade may catch in the wind or air, causing the trailing blade to stop while pointing roughly forward and the leading blade (1004) to stop while pointing roughly backward. When stopped, the blades should be pointing in the opposite directions, (i.e., leading blade 1004 should be facing forward and trailing blade 1002 should be facing backward). Also, in this stopped position, the trailing blade will be tilted up (i.e., above level plane 1000) and leading blade 1004 will be tilted down (i.e., below level plane 1000). When stopped, the blades should substantially be in level plane 1000 because this minimizes the drag from the stopped blades when the aircraft is moving forward. In some embodiments, the rotor controller detects the position shown in this figure using one or more of the components shown in FIG. 7.

In some embodiments, a stopped rotor aircraft detects when its stoppable rotor is in an unstable position (e.g., while coming to a stop or has stopped in such a position) and responds accordingly. The following figure describes an example of this.

Figure 11:
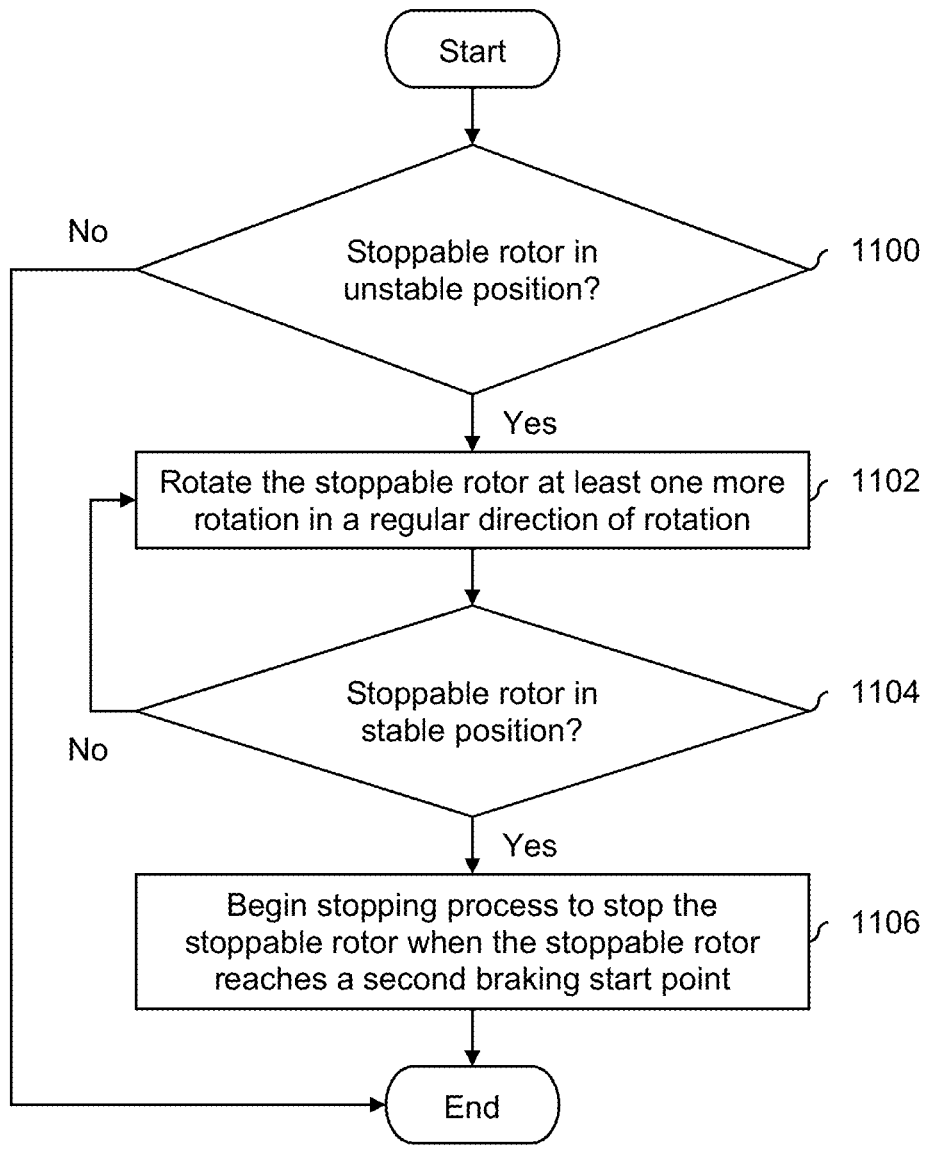
FIG. 11 is a flowchart illustrating an embodiment of a process to detect an unstable position of the stoppable rotor and continue a rotation in a normal direction of rotation.

FIG. 11 is a flowchart illustrating an embodiment of a process to detect an unstable position of the stoppable rotor and continue a rotation in a normal direction of rotation. In the example shown, the process is performed during a stopping process. For example, the process is performed at state 902 in FIG. 9. In some embodiments, the process of FIG. 11 is performed combination with the process of FIG. 8.

At 1100, it is determined if the stoppable rotor is in an unstable position. In some embodiments, this check is performed once the stoppable rotor has stopped and the angular rate (i.e., angular speed) of the stoppable rotor is zero. In some embodiments, if (at that time) the trailing blade is generally pointing forwards (e.g., the rotational angle of the stoppable rotor is between or within some range of angles) and/or the tilt angle of the stoppable rotor indicates that the stoppable rotor has substantially left a level plane (e.g., the tilt angle is within some range of range of angles), then it is determined that the stoppable rotor is in an unstable position.

In some embodiments, step 1100 analyzes the stability of the stoppable rotor even before the stoppable rotor comes to a stop. For example, the checks described above with respect to the rotational angle and tilt angle may be performed while the angular rate of the stoppable rotor is a positive (i.e., non-zero) value and the stoppable rotor is still moving.

Referring back to FIG. 7, step 1100 may be performed using any of the components shown there to detect when that stoppable rotor has stopped and if the stoppable rotor is properly positioned (e.g., the gyroscopes (702*a* and 702*b*) may provide the angular rate and the lasers (703*a* and 703*b*) and laser sensor(s) 714 may provide the rotational angle).

Step 1100 may be performed as many times as desired, for example continuously while a stopping process is being performed until the stoppable rotor comes to a stop. If the decision at step 1100 is No (e.g., for all of the checks performed, if performed multiple times), the process ends (e.g., because the stoppable rotor was always stable and no intervention was required).

Otherwise, if the decision at step 1100 is Yes (e.g., for any of the one or more times step 1100 is performed), the stoppable rotor is rotated at least one more rotation in a regular direction of rotation at 1102. For example, if the motors which power the stoppable rotor are applying a negative torque to stop the stoppable rotor, then the motor(s) may (e.g., briefly or temporarily) apply a positive torque to continue rotating in the regular direction of rotation. As used herein, the term "regular direction of rotation" of the stoppable rotor is the direction of rotation when the aircraft is hovering and the stoppable rotor provides vertical thrust and vertical lift. Since the check at 1100 may be performed while the stoppable rotor is still rotating in the regular direction of rotation (at least in some embodiments), rotating the stoppable rotor at least one more rotation in the regular direction of rotation may get the stoppable rotor out of the unstable position while working with, and not against, inertia.

At 1104, it is determined if the stoppable rotor is in a stable position. If it is determined that the stoppable rotor is not in a stable position at step 1104, the stoppable rotor is rotated at least one more rotation in a regular direction of rotation at step 1102. For example, the motor(s) for the stoppable rotor may continue to apply positive torque until the stoppable rotor is detected to be in the level plane. That is, the system checks for some condition to be met before trying to stop the stoppable rotor again. In some embodiments, the motor(s) to the stoppable rotor may be run for a fixed amount of time. In some embodiments, the aircraft gradually steps up the angular or motor speed (as needed) in order to get the stoppable rotor into the level plane. For example, a small tilt up/down may not require that much angular speed to return the blades to the level plane, and it may be desirable to keep the angular speed low so that the stoppable rotor can be stopped sooner.

If it is determined that the stoppable rotor is in a stable position at step 1104, the stopping process to stop the stoppable rotor is begun when the stoppable rotor reaches a second braking start point at 1106. In other words, the stopping process is performed again from the beginning, for example by having the motors apply a negative torque on the stoppable rotor once the second braking start point is reached. For example, the stoppable rotor is probably not rotating at the same angular rate and therefore a new (e.g., second) braking start point is calculated to reflect the new, probably slower angular rate.

In some embodiments, feedback is used to adjust an amount of (negative) torque applied during a stopping process. The following figure shows one example of this.

Figure 12:
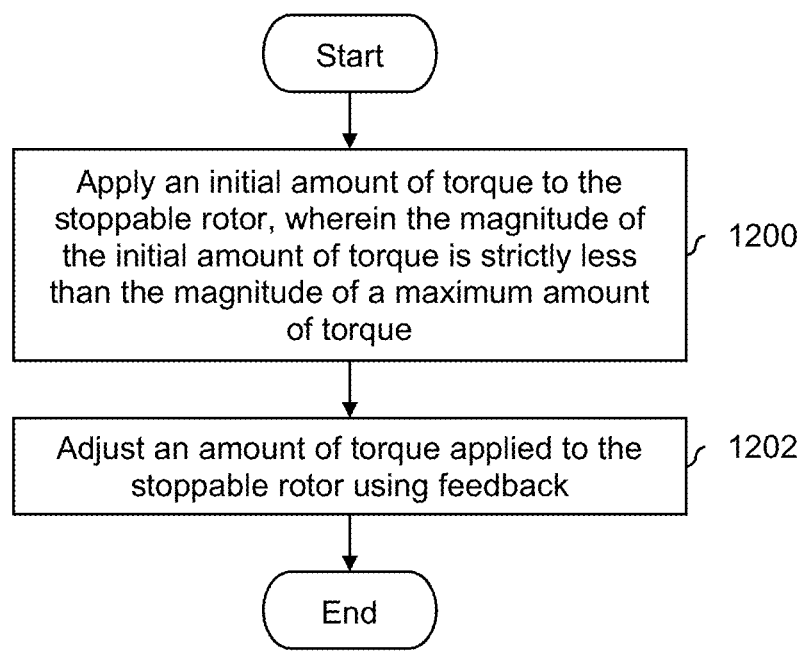
FIG. 12 is a flowchart illustrating an embodiment of a stopping process which uses feedback.

FIG. 12 is a flowchart illustrating an embodiment of a stopping process which uses feedback. In some embodiments, this stopping process is used at step 802 in FIG. 8, in state 902 in FIG. 9, and/or at step 1106 in FIG. 11.

At 1200, an initial amount of torque is applied to the stoppable rotor, wherein the magnitude of the initial amount of torque is strictly less than the magnitude of a maximum amount of torque. In some embodiments, the torque applied is negative where positive torque will cause the stoppable rotor to rotate in a regular direction of rotation (e.g., such as when the stoppable rotor is used during hovering to provide vertical lift and vertical thrust). By using strictly less than the maximum amount of torque, some additional torque will be held in reserve should the feedback loop require more torque (e.g., if the maximum amount of negative torque is −135 Newton meters and the torque is initially set to that, the system will have no recourse if the feedback loop wants to increase the amount of negative torque to −140 Newton meters).

At 1202, an amount of torque applied to the stoppable rotor is adjusted using feedback. In some embodiments, the feedback at step 1202 includes using a proportional-derivative (PD) controller, which is a type of feedback controller or feedback loop. The following figures show an example of this.

Figure 13:
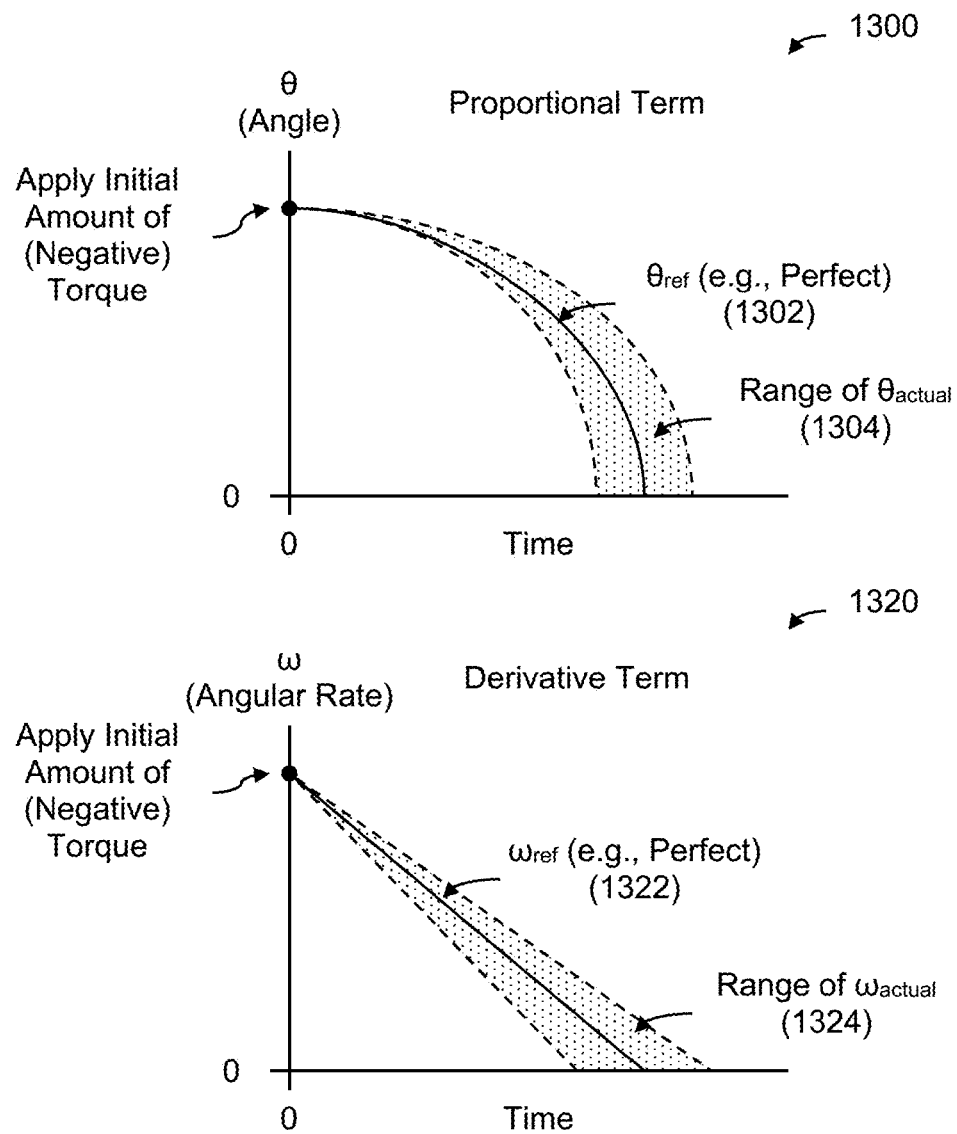
FIG. 13 is a diagram illustrating an embodiment of a proportional-derivative (PD) controller used to adjust an amount of negative torque used to stop a stoppable rotor.

FIG. 13 is a diagram illustrating an embodiment of a proportional-derivative (PD) controller used to adjust an amount of negative torque used to stop a stoppable rotor. In this example, a PD controller (which is a type of feedback controller or feedback loop) is shown. The rotational angle (i.e., $\theta$) associated with diagram 1300 and the angular rate (i.e., $\omega$) associated with diagram 1320 are referred to as the proportional term and the derivative term, respectively, because angular rate is the derivative of the rotational angle (i.e., $\omega = d\theta/dt$).

Diagram 1300 shows an example of a proportional term which in this example is associated with the rotational angle of the stoppable rotor. At time t=0, an initial amount of negative torque is applied to the stoppable rotor. This corresponds to the time or rotational angle when the stopping process begins. For example, in the context of step 802 in FIG. 8, time t=0 corresponds to when the stoppable rotor reaches the braking start point.

Curve 1302 represents a reference value for the angle of the stoppable rotor (i.e., $\theta_{ref}$). In a perfect system, the actual angle (i.e., $\theta_{actual}$) of the stoppable rotor as time progresses (and as the initial amount of negative torque causes the stoppable rotor to come to a stop) would exactly match of the reference angle, $\theta_{ref}$. However, in real-world systems there will be some difference and this range of $\theta_{actual}$ is shown as dotted area 1304. In some embodiments, $\theta_{actual}$ is obtained using the lasers (703a and 703b) and laser sensors (714) shown in FIG. 7.

Diagram 1320 is similar to diagram 1300 but shows a derivative term associated with the angular rate of the stoppable rotor. As before, an initial amount of negative torque is applied at time t=0. Line 1322 shows $\omega_{ref}$ (e.g., the reference angular rate), and dotted area 1324 shows the range of $\omega_{actual}$ (e.g., the actual angular rate). In some embodiments, $\omega_{actual}$ is obtained using the gyroscopes (702a and 702b) shown in FIG. 7.

Diagram 1340 shows how the (negative) torque which is applied to the stoppable rotor is adjusted using the exemplary PD controller in order to compensate for any difference between the actual and reference rotational angle, as well as any difference between the actual and reference angular rate. $\tau$ is the (negative) torque which is output by one or more motors and control the rotation of the stoppable rotor. This is the value which is adjusted by the PD controller per diagram 1340. The first term in the equation (i.e., $\tau_{initial}$) is the initial amount of (negative) torque which is applied at time t=0 in diagram 1300 and diagram 1320. In this example, the initial amount of negative torque is set to 90% of a maximum amount of negative torque. For example, this leaves some negative torque in reserve in case the PD controller requires more negative torque to be applied.

The second term (e.g., $C_p(\theta_{ref} - \theta_{actual})$) and third term (e.g., $C_d(\omega_{ref} - \omega_{actual})$) in the equation are used to adjust the torque after the initial torque is applied, while the stoppable rotor is slowing down. If the difference between the actual and reference rotational angle (i.e., $(\theta_{ref} - \theta_{actual})$, which is also the rotational angle error) equals zero and the difference between the actual and reference rotational angle (i.e., $(\omega_{ref} - \omega_{actual})$, which is also the rotational angle error) is also zero, then the torque applied will remain set to the initial torque (i.e., $\tau = \tau_{initial}$). However, if either of those differences or errors is non-zero, then the torque will be adjusted accordingly. The terms $C_p$ and $C_d$ are scaling factors (i.e., constants).

Diagram 1360 shows how the PD controller may be used to adjust a nominal torque of 0 once the stoppable rotor has come to a complete stop at the desired stop position. For example, to minimize weight and/or complexity, a stoppable rotor may not necessarily include a lock (e.g., mechanical or magnetic) to lock the stoppable rotor in a desired stop position once the stoppable rotor has stopped there. To keep is in the desired stop position, the PD controller may be used to "nudge" the stoppable rotor back into position should it shift slightly using a small amount of positive torque or negative torque. Between diagram 1340 and diagram 1360, $\tau_{initial}$ is set to 0, (e.g., there is a nominal torque of 0), $\theta_{ref}$ is set to 0 (e.g., which corresponds to the desired stop position), and $\omega_{ref}$ is set to 0 (e.g., because the stoppable rotor has stopped rotating). Naturally, a stoppable rotor may include a (e.g., mechanical and/or magnetic) lock and in such embodiments a PD controller does not adjust a nominal torque of 0 while the stoppable rotor is stopped at the desired stop position.

In some embodiments, there is a check or process which decides when to stop applying the (negative) torque to brake the stoppable rotor and switch to zero torque (e.g., at or near the desired top position). For example, this corresponds to switching from the torque specified in diagram 1340 to the torque specified in diagram 1360. Both overshooting and undershooting the desired stop position is undesirable. To determine when to release the (negative) stopping torque, such a check or process may evaluate the current state of the stoppable rotor in order to determine if (e.g., hypothetically) the (negative) stopping torque was no longer applied, if the stoppable rotor would come to a stop at the desired stop position. In some embodiments, this evaluation may input the current angular rate (i.e., $\omega_{actual}$) and rotational angle (i.e., $\theta_{actual}$).

PD controllers are part of a more general class of controllers referred to as proportional-integral-derivative (PID) controllers. Although an integral term is not shown and/or used in this example, in some embodiments an integral term is used. For example, there may be another, third term associated with the integral term (e.g., an integration of the angular error (i.e., $(\theta_{ref} - \theta_{actual})$)).

The following figure shows an exemplary stoppable rotor at various rotational angles which are of interest to this PD controller example.

Figure 14:
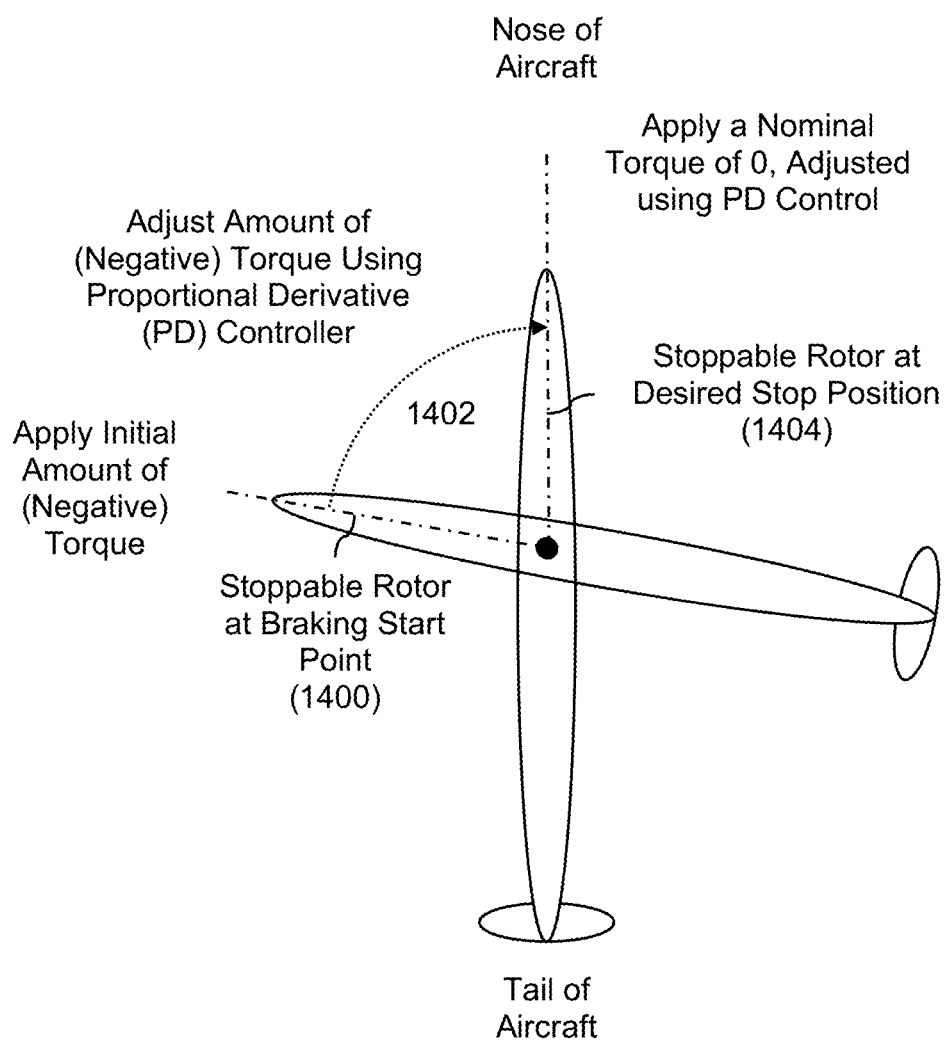
FIG. 14 is a diagram illustrating an embodiment of a stoppable rotor which is stopped using a proportional-derivative (PD) controller.

FIG. 14 is a diagram illustrating an embodiment of a stoppable rotor which is stopped using a proportional-derivative (PD) controller. From this top view, the stoppable rotor's regular direction of rotation (e.g., while hovering) is clockwise. Stoppable rotor 1400 shows the stoppable rotor at the braking start point when the initial amount of (negative) torque is applied. For example, this corresponds to time t=0 in diagram 1300 and diagram 1320 in FIG. 13.

The stoppable rotor will start to slow down (e.g., due to the negative torque being applied) but will continue to rotate through angular region 1402 between the braking start point (1400) and the desired stop position (1404). In this region, the amount of negative torque is adjusted using a PD controller. For example, the equation shown in diagram 1340 in FIG. 13 is used to control or otherwise adjust the amount of torque applied to the stoppable rotor in angular region 1402.

Stoppable rotor (1404) shows the stoppable rotor at the desired stop position where the blade without the tailfin is pointing forward (i.e., toward or over the nose of the aircraft) and the blade with the tailfin is pointing backward (i.e., toward or over the tail of the aircraft). This is the position the stoppable rotor will be held in while the stoppable rotor is off. A torque of zero is (nominally) be applied since a positive torque would cause the stoppable rotor to rotate in the clockwise direction and a negative torque would cause the stoppable rotor to rotate in the counterclockwise direction. In a perfect system or environment, the stoppable rotor would not shift or move and the torque would remain at 0. However, should the stoppable rotor shift slightly clockwise (or counterclockwise), a small amount of negative (or positive) torque in some embodiments is applied by the PD controller to return the stoppable rotor to the desired stop position. See, for example, diagram 1360 in FIG. 13.

The following figures describe these examples more generally and/or formally in flowcharts.

Figure 15:
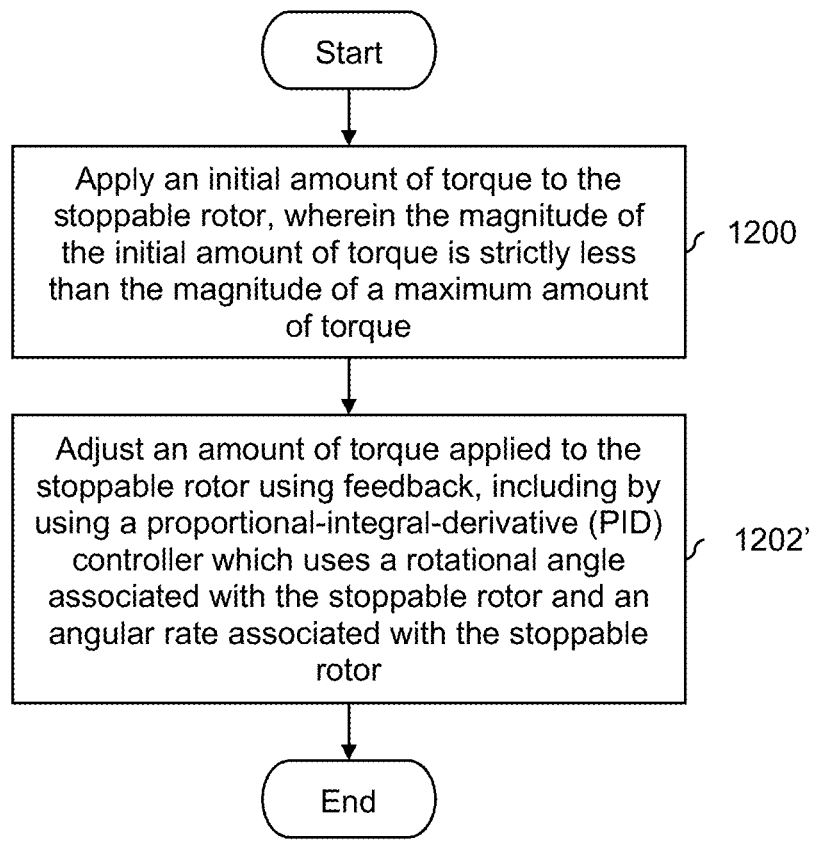
FIG. 15 is a flowchart illustrating an embodiment of a stopping process which uses a proportional-integral-derivative (PID) controller.

FIG. 15 is a flowchart illustrating an embodiment of a stopping process which uses a proportional-integral-derivative (PID) controller. FIG. 15 is similar to FIG. 12 and for convenience similar reference numbers are used. As with FIG. 12, FIG. 15 may be used at step 802 in FIG. 8, in state 902 in FIG. 9, and/or at step 1106 in FIG. 11.

At 1200, an initial amount of torque is applied to the stoppable rotor, wherein the magnitude of the initial amount of torque is strictly less than the magnitude of a maximum amount of torque. See, for example, time t=0 in diagram 1300 and diagram 1320 in FIG. 13 and the braking staring point (1400) in FIG. 14.

At 1202', an amount of torque applied to the stoppable rotor is adjusted using feedback, including by using a proportional-integral-derivative (PID) controller which uses a rotational angle associated with the stoppable rotor and an angular rate associated with the stoppable rotor. FIG. 13 shows one example of this with a PD controller which uses a proportional term associated with rotational angle and a derivative term associated with angular rate. Or, a PID controller may be used which uses an integral term, a proportional term, and a derivative term.

Figure 16:
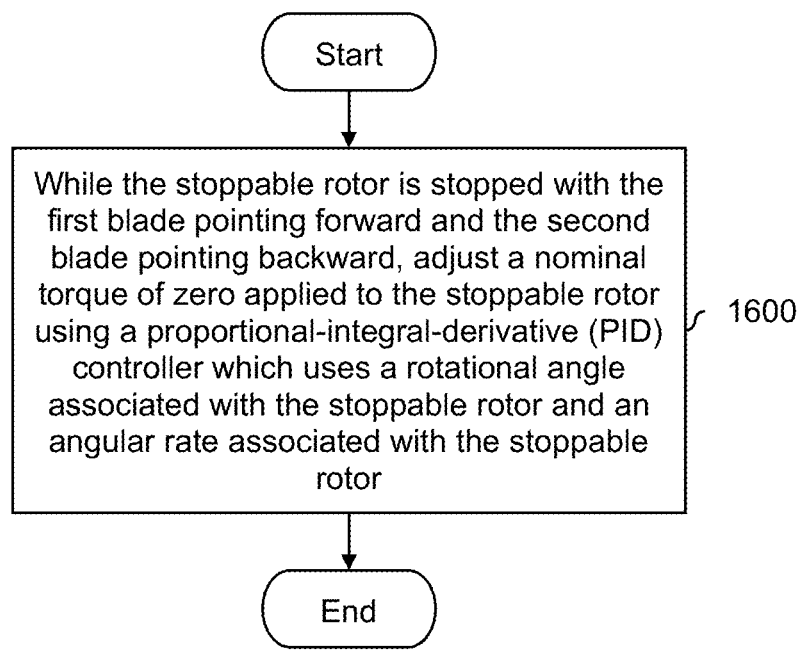
FIG. 16 is a flowchart illustrating an embodiment of a process to maintain a desired stop position.

FIG. 16 is a flowchart illustrating an embodiment of a process to maintain a desired stop position. For example, the process of FIG. 16 may be performed during state 904 in FIG. 9 and/or may be performed in combination with any of the above techniques and/or processes.

At 1600, while the stoppable rotor is stopped with the first blade pointing forward and the second blade pointing backward, a nominal torque of zero applied to the stoppable rotor is adjusted using a proportional-integral-derivative (PID) controller which uses a rotational angle associated with the stoppable rotor and an angular rate associated with the stoppable rotor. As described above, this may include using a PD controller which uses (only) a proportional term and a derivative term (see, for example, diagram 1360 in FIG. 13), or a PID controller which uses a proportional term, an integral term, and a derivative term.

It is noted that step 1600 may use the same PID controller as the process of FIG. 12, but with different settings or configurations. For example, as shown in FIG. 13, $\tau_{initial}$ may be set to either $0.9 \cdot \tau_{max\_neg}$ (see diagram 1340) or to 0 (see diagram 1360).

One potential problem with the stopping process is that the stopping process may trigger before the stoppable rotor actually reaches the braking start point, for example due to noise. The following figures describe an example of a technique to reduce the likelihood of this.

Figure 17:
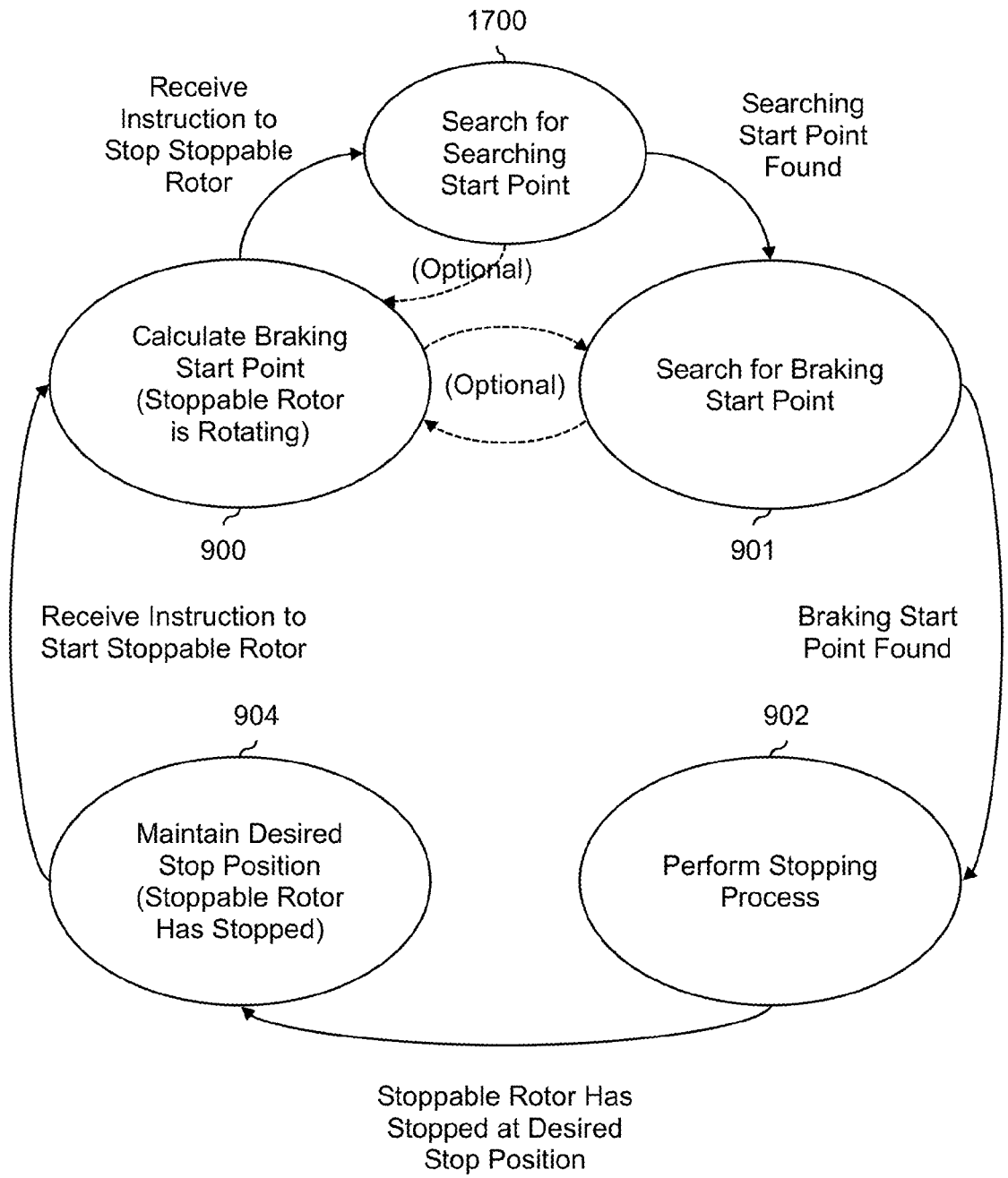
FIG. 17 is a diagram illustrating an embodiment of a state machine associated with a stoppable rotor controller which includes a state to wait for a searching start point.

FIG. 17 is a diagram illustrating an embodiment of a state machine associated with a stoppable rotor controller which includes a state to wait for a searching start point. FIG. 17 is similar to FIG. 9 and for convenience similar reference numbers are used.

In this example, when the controller is in state 900 (i.e., the calculate braking start point state) and an instruction to stop the stoppable rotor is received, the controller goes into state 1700 where it waits for a searching start point. In this state, the controller examines the rotational angle of the stoppable rotor not to find the braking start point and/or trigger the stop process, but rather to find the searching start point. The searching start point is some pre-defined point (e.g., in time or an angle) before of the braking start point. In examples described herein, the searching start point is ⅓ of a complete rotation before the braking start point. In other words, the stopping process cannot (e.g., prematurely) trigger before the searching start point has been reached.

Once the stoppable rotor reaches the searching start point, the controller switches to state 901 where the process searches for the braking start point. In this state, the controller examines the rotational angle of the stoppable rotor in order to find the braking start point so that it can trigger the stopping process.

In some embodiments, the state machine may have a state transition from state 1700 to state 900 and/or a state transition from state 901 to state 900 so that the braking start point can continue to be recalculated (e.g., in state 900) while waiting for the searching start point (e.g., in state 1700) and/or while waiting for the braking start point (e.g., in state 901). As described above, if braking start point is found relatively quickly then it may be acceptable to not recalculate the braking start point while in these states. Alternatively, if the braking start point changes quickly and/or it takes awhile until the braking start point is found, then the braking start point may be recalculated during those states. See, for example, the dashed lines in this figure.

The rest of the state machine is the same as in FIG. 9 and for brevity is not described here.

The following figure shows an example of a searching start point.

Figure 18:
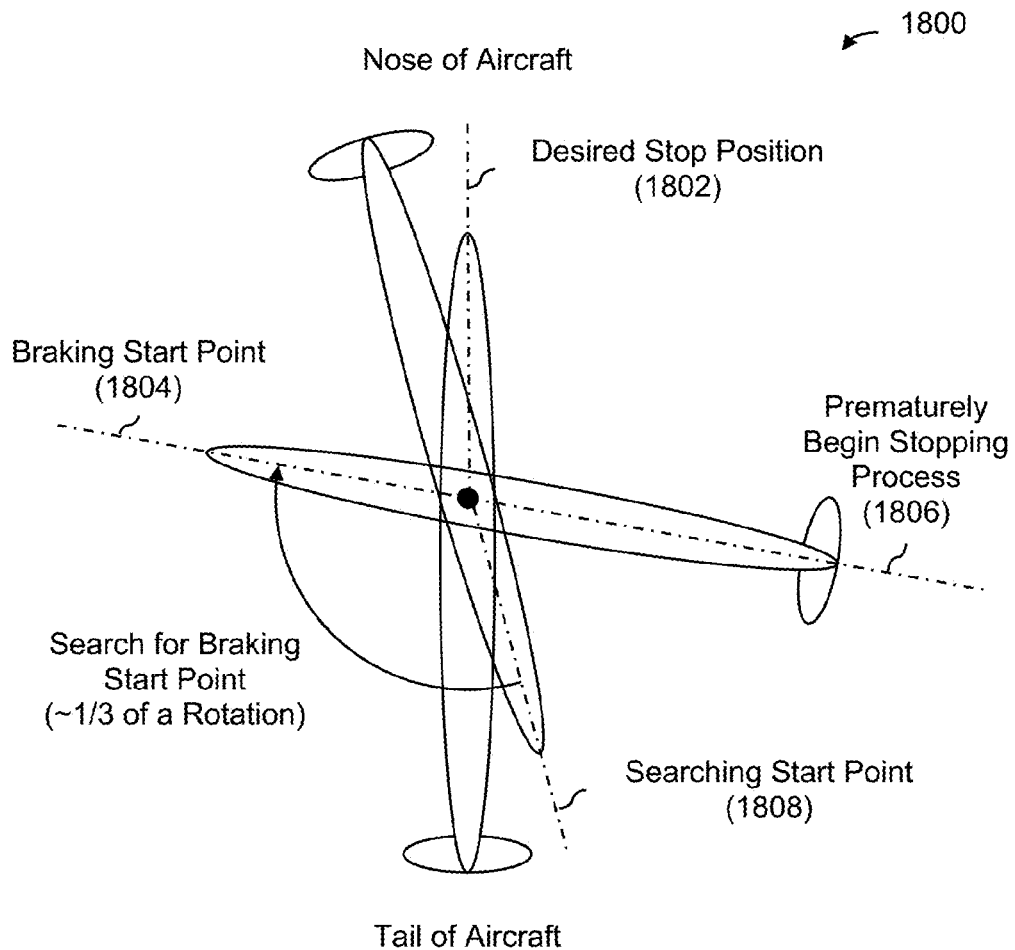
FIG. 18 is a diagram illustrating an embodiment of a searching start point and noise which prematurely triggers a stopping process.
Figure 18:
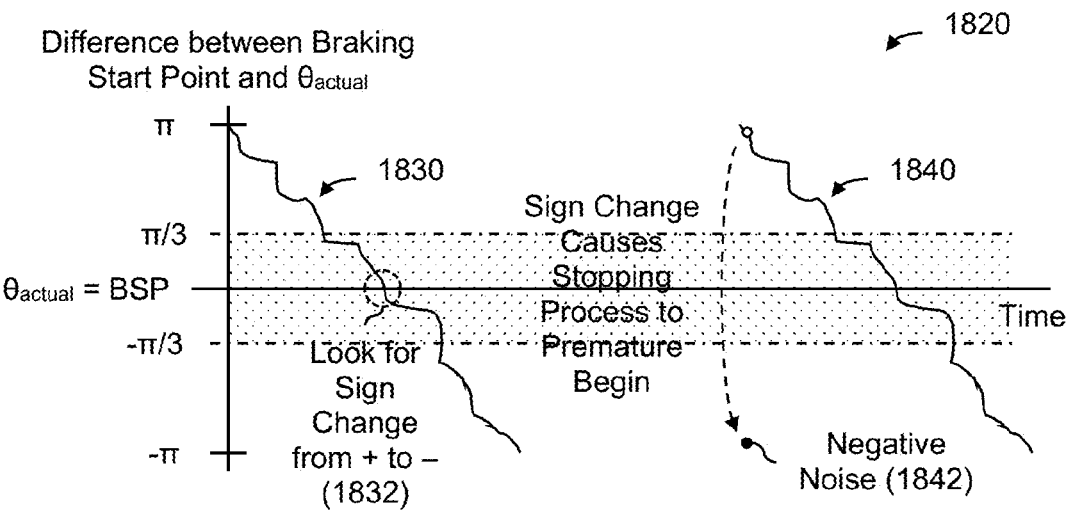

FIG. 18 is a diagram illustrating an embodiment of a searching start point and noise which prematurely triggers a stopping process. Diagram 1800 shows the stoppable rotor in a variety of positions. Position 1802 shows the stoppable rotor in the desired stop position. The braking start point which would result in this desired stop position is shown as position 1804.

One problem is that noise may cause the stopping process to trigger prematurely. Diagram 1820 shows how the braking start point is detected and the stopping process is triggered. In this diagram, the x-axis is time and the y-axis is the difference between the braking start point (e.g., position 1804) and the current or actual rotational angle (e.g., $\theta_{actual}$). Difference function 1830 shows an example of an error free detection of the braking start point. To detect when the stoppable rotor is at the braking start point, a sign change in the difference function (1830) from positive to negative is searched for. See, for example the sign change at 1832 which shows an error free detection of the braking start point.

Difference function 1830 shows an example of how noise may cause the system to erroneously think the stoppable rotor is at the braking start point and prematurely trigger the stopping process. Difference function 1830 includes a point discontinuity where some noise in the system results in a difference value which has a magnitude close to $\pi$ but has a negative sign (i.e., negative noise 1842 in the diagram). If the braking start point detection rule is to "look for a sign change from positive to negative" then negative noise 1842 will cause the system to think the stoppable rotor is at the braking start point and will cause the stopping process to trigger prematurely. In diagram 1800, this premature triggering of the stopping process corresponds to position 1806, which is roughly 180° off of the braking start point (to preserve the readability of the figure, a stoppable rotor at position 1806 is not shown).

To prevent such noise from prematurely triggered the stopping process, sign changes with a large magnitude (e.g., at magnitudes near $\pi$) may be ignored when trying to determine when the stoppable rotor is at the braking start point. In diagram 1820, this corresponds to only declaring that the stoppable rotor is at the braking start point when a sign change occurs in the dotted region between $\pi/3$ and $-\pi/3$. Note that this dotted region would cause the sign change which occurs in difference function 1840 to be ignored but the sign change in difference function 1830 would properly cause the stopping function to be triggered.

In diagram 1800, this corresponds to not searching for the braking start point until $\frac{1}{3}$ of a rotation before the braking start point (i.e., at searching start point 1808). Note that position 1808 (e.g., where the stopping process triggered prematurely due to noise) is before the searching start point (1808), so with this technique the error scenario described above can be avoided.

As with the braking start point, the searching start point may either be expressed in time or an angle and so although this example shows the searching start point as an angle, other embodiments may express or represent the searching start point as a time. Also, although the searching start point is shown here as being $\frac{1}{3}$ of a rotation before the braking start point, any relationship may be used (e.g., $\frac{1}{4}$ of a rotation before the braking start point, etc.).

The following figure describes this more formally and/or generally in a flowchart.

Figure 19:
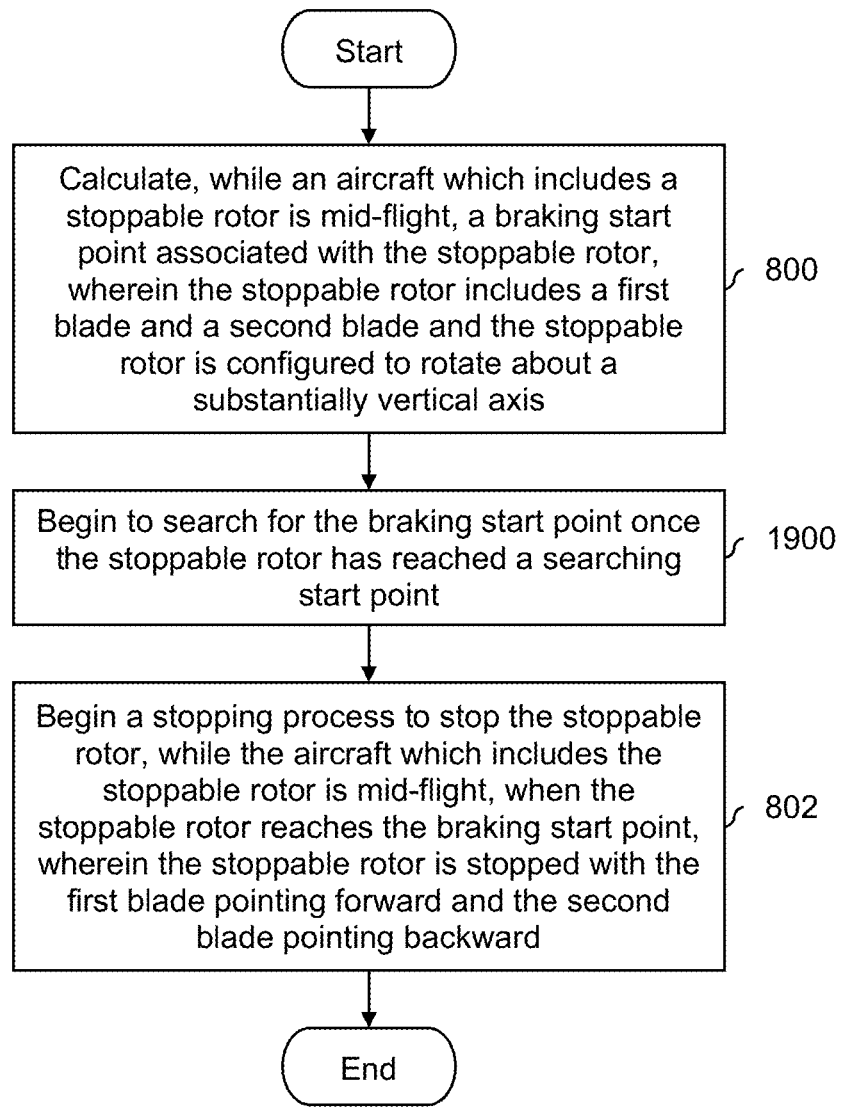
FIG. 19 is a flowchart illustrating an embodiment of process to stop a stoppable rotor using a searching start point.

FIG. 19 is a flowchart illustrating an embodiment of process to stop a stoppable rotor using a searching start point. FIG. 19 is similar to FIG. 8 and for convenience similar reference numbers are used. FIG. 19 may be performed in combination with any of the techniques and/or processes described above.

At 800, while an aircraft which includes a stoppable rotor is mid-flight, a braking start point associated with the stoppable rotor is calculated, wherein the stoppable rotor includes a first blade and a second blade and the stoppable rotor is configured to rotate about a substantially vertical axis.

At 1900, a search for the braking start point is begun once the stoppable rotor has reached a searching start point. As described above, until the searching start point is reached by the stoppable rotor, the controller will not search for the braking start point with the intention of trigger the stopping process. To put it another way, conceptually, the stopping process is not "armed" until the searching start point is reached. See, for example, state 1700 (i.e., search for searching start point) in FIG. 17 and searching start point 1810 in FIG. 18 (e.g., at which point the braking start point is searched for and the stopping process is "armed"). In some embodiments, the difference between the searching start point and the braking start point is a pre-defined amount (e.g., $\frac{1}{3}$ of a complete rotation in FIG. 18).

At 802, a stopping process to stop the stoppable rotor begins, while the aircraft which includes the stoppable rotor is mid-flight, when the stoppable rotor reaches the braking start point, wherein the stoppable rotor is stopped with the first blade pointing forward and the second blade pointing backward.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a processor; and
   a memory coupled with the processor, wherein the memory is configured to provide the processor with instructions which when executed cause the processor to:
   calculate, while an aircraft which includes a stoppable rotor is mid-flight, a braking start point associated with the stoppable rotor, wherein the stoppable rotor includes a first blade and a second blade and the stoppable rotor is configured to rotate about a substantially vertical axis;
   start a process to stop the stoppable rotor, while the aircraft which includes the stoppable rotor is mid-flight, when the stoppable rotor reaches the braking start point, wherein the stoppable rotor is stopped with the first blade pointing forward and the second blade pointing backward;
   determine if the stoppable rotor is in an unstable position once the stoppable rotor has stopped; and
   in the event it is determined that the stoppable rotor is in an unstable position:
   rotate the stoppable rotor at least one more rotation in a regular direction of rotation; and
   begin the stopping process to stop the stoppable rotor when the stoppable rotor reaches a second braking start point.

2. The system recited in claim 1, wherein the stopping process includes:
   applying an initial amount of torque to the stoppable rotor, wherein the magnitude of the initial amount of torque is strictly less than the magnitude of a maximum amount of torque; and
   adjusting an amount of torque applied to the stoppable rotor using feedback.

3. The system recited in claim 1, wherein the stopping process includes:
   applying an initial amount of torque to the stoppable rotor, wherein the magnitude of the initial amount of torque is strictly less than the magnitude of a maximum amount of torque; and
   adjusting an amount of torque applied to the stoppable rotor using feedback, including by using a proportional-integral-derivative (PID) controller which uses a rotational angle associated with the stoppable rotor and an angular rate associated with the stoppable rotor.

4. The system recited in claim 1, wherein the memory is further configured to provide the processor with instructions which when executed cause the processor to: while the stoppable rotor is stopped with the first blade pointing forward and the second blade pointing backward, adjust a nominal torque of zero applied to the stoppable rotor using a proportional-integral-derivative (PID) controller which uses a rotational angle associated with the stoppable rotor and an angular rate associated with the stoppable rotor.

5. The system recited in claim 1, wherein:
   the stopping process includes:

applying an initial amount of torque to the stoppable rotor, wherein the magnitude of the initial amount of torque is strictly less than the magnitude of a maximum amount of torque; and adjusting an amount of torque applied to the stoppable rotor using feedback, including by using a proportional-integral-derivative (PID) controller which uses a rotational angle associated with the stoppable rotor and an angular rate associated with the stoppable rotor; and the memory is further configured to provide the processor with instructions which when executed cause the processor to: while the stoppable rotor is stopped with the first blade pointing forward and the second blade pointing backward, adjust a nominal torque of zero applied to the stoppable rotor using a proportional-integral-derivative (PID) controller which uses a rotational angle associated with the stoppable rotor and an angular rate associated with the stoppable rotor.

6. The system recited in claim 1, wherein the memory is further configured to provide the processor with instructions which when executed cause the processor to: begin to search for the braking start point once the stoppable rotor has reached a searching start point.

7. The system recited in claim 1, wherein the memory is further configured to provide the processor with instructions which when executed cause the processor to: begin to search for the braking start point once the stoppable rotor has reached a searching start point, wherein a difference between the searching start point and the braking start point is a pre-defined amount.

8. A system comprising:
a processor; and
a memory coupled with the processor, wherein the memory is configured to provide the processor with instructions which when executed cause the processor to:
calculate, while an aircraft which includes a stoppable rotor is mid-flight, a braking start point associated with the stoppable rotor, wherein the stoppable rotor includes a first blade and a second blade and the stoppable rotor is configured to rotate about a substantially vertical axis; and
start a process to stop the stoppable rotor, while the aircraft which includes the stoppable rotor is mid-flight, when the stoppable rotor reaches the braking start point, wherein the stoppable rotor is stopped with the first blade pointing forward and the second blade pointing backward;
determine if the stoppable rotor is in an unstable position before the stoppable rotor comes to a stop; and
in the event it is determined that the stoppable rotor is in an unstable position:
rotate the stoppable rotor at least one more rotation in a regular direction of rotation; and
begin the stopping process to stop the stoppable rotor when the stoppable rotor reaches a second braking start point.

9. A method, comprising:
calculating, while an aircraft which includes a stoppable rotor is mid-flight, a braking start point associated with the stoppable rotor, wherein the stoppable rotor includes a first blade and a second blade and the stoppable rotor is configured to rotate about a substantially vertical axis;

starting a process to stop the stoppable rotor, while the aircraft which includes the stoppable rotor is mid-flight, when the stoppable rotor reaches the braking start point, wherein the stoppable rotor is stopped with the first blade pointing forward and the second blade pointing backward;
determining if the stoppable rotor is in an unstable position once the stoppable rotor has stopped; and
in the event it is determined that the stoppable rotor is in an unstable position:
rotating the stoppable rotor at least one more rotation in a regular direction of rotation; and
beginning the stopping process to stop the stoppable rotor when the stoppable rotor reaches a second braking start point.

10. The method recited in claim 9, wherein the stopping process includes:
applying an initial amount of torque to the stoppable rotor, wherein the magnitude of the initial amount of torque is strictly less than the magnitude of a maximum amount of torque; and
adjusting an amount of torque applied to the stoppable rotor using feedback.

11. The method recited in claim 9, wherein the stopping process includes:
applying an initial amount of torque to the stoppable rotor, wherein the magnitude of the initial amount of torque is strictly less than the magnitude of a maximum amount of torque; and
adjusting an amount of torque applied to the stoppable rotor using feedback, including by using a proportional-integral-derivative (PID) controller which uses a rotational angle associated with the stoppable rotor and an angular rate associated with the stoppable rotor.

12. The method recited in claim 9 further comprising: while the stoppable rotor is stopped with the first blade pointing forward and the second blade pointing backward, adjusting a nominal torque of zero applied to the stoppable rotor using a proportional-integral-derivative (PID) controller which uses a rotational angle associated with the stoppable rotor and an angular rate associated with the stoppable rotor.

13. The method recited in claim 9, wherein:
the stopping process includes:
applying an initial amount of torque to the stoppable rotor, wherein the magnitude of the initial amount of torque is strictly less than the magnitude of a maximum amount of torque; and
adjusting an amount of torque applied to the stoppable rotor using feedback, including by using a proportional-integral-derivative (PID) controller which uses a rotational angle associated with the stoppable rotor and an angular rate associated with the stoppable rotor; and
the method further includes: while the stoppable rotor is stopped with the first blade pointing forward and the second blade pointing backward, adjusting a nominal torque of zero applied to the stoppable rotor using a proportional-integral-derivative (PID) controller which uses a rotational angle associated with the stoppable rotor and an angular rate associated with the stoppable rotor.

14. The method recited in claim 9 further comprising: beginning to search for the braking start point once the stoppable rotor has reached a searching start point.

15. The method recited in claim 9 further comprising: begin to search for the braking start point once the stoppable rotor has reached a searching start point, wherein a difference between the searching start point and the braking start point is a pre-defined amount.

16. A method comprising:
   calculating, while an aircraft which includes a stoppable rotor is mid-flight, a braking start point associated with the stoppable rotor, wherein the stoppable rotor includes a first blade and a second blade and the stoppable rotor is configured to rotate about a substantially vertical axis;
   starting a process to stop the stoppable rotor, while the aircraft which includes the stoppable rotor is mid-flight, when the stoppable rotor reaches the braking start point, wherein the stoppable rotor is stopped with the first blade pointing forward and the second blade pointing backward;
   determining if the stoppable rotor is in an unstable position before the stoppable rotor comes to a stop; and
   in the event it is determined that the stoppable rotor is in an unstable position:
      rotating the stoppable rotor at least one more rotation in a regular direction of rotation; and
      beginning the stopping process to stop the stoppable rotor when the stoppable rotor reaches a second braking start point.

17. A computer program product, the computer program product being embodied in a non-transitory computer readable storage medium and comprising computer instructions for:
   calculating, while an aircraft which includes a stoppable rotor is mid-flight, a braking start point associated with the stoppable rotor, wherein the stoppable rotor includes a first blade and a second blade and the stoppable rotor is configured to rotate about a substantially vertical axis;
   starting a process to stop the stoppable rotor, while the aircraft which includes the stoppable rotor is mid-flight, when the stoppable rotor reaches the braking start point, wherein the stoppable rotor is stopped with the first blade pointing forward and the second blade pointing backward;
   determining if the stoppable rotor is in an unstable position once the stoppable rotor has stopped; and
   in the event it is determined that the stoppable rotor is in an unstable position:
      rotating the stoppable rotor at least one more rotation in a regular direction of rotation; and
      beginning the stopping process to stop the stoppable rotor when the stoppable rotor reaches a second braking start point.

18. A computer program product, the computer program product being embodied in a non-transitory computer readable storage medium and comprising computer instructions for:
   calculating, while an aircraft which includes a stoppable rotor is mid-flight, a braking start point associated with the stoppable rotor, wherein the stoppable rotor includes a first blade and a second blade and the stoppable rotor is configured to rotate about a substantially vertical axis;
   starting a process to stop the stoppable rotor, while the aircraft which includes the stoppable rotor is mid-flight, when the stoppable rotor reaches the braking start point, wherein the stoppable rotor is stopped with the first blade pointing forward and the second blade pointing backward;
   determining if the stoppable rotor is in an unstable position before the stoppable rotor comes to a stop; and
   in the event it is determined that the stoppable rotor is in an unstable position:
      rotating the stoppable rotor at least one more rotation in a regular direction of rotation; and
      beginning the stopping process to stop the stoppable rotor when the stoppable rotor reaches a second braking start point.

\* \* \* \* \*